July 7, 1931.  F. A. ALLNER  1,813,107
METHOD OF AND MEANS FOR INCREASING THE USEFUL
LOW FLOW CAPACITY OF A HYDROELECTRIC PLANT
Filed Nov. 30, 1929  14 Sheets-Sheet 1

INVENTOR
F. A. Allner
BY
Thomas W. Y. Clark
ATTORNEY

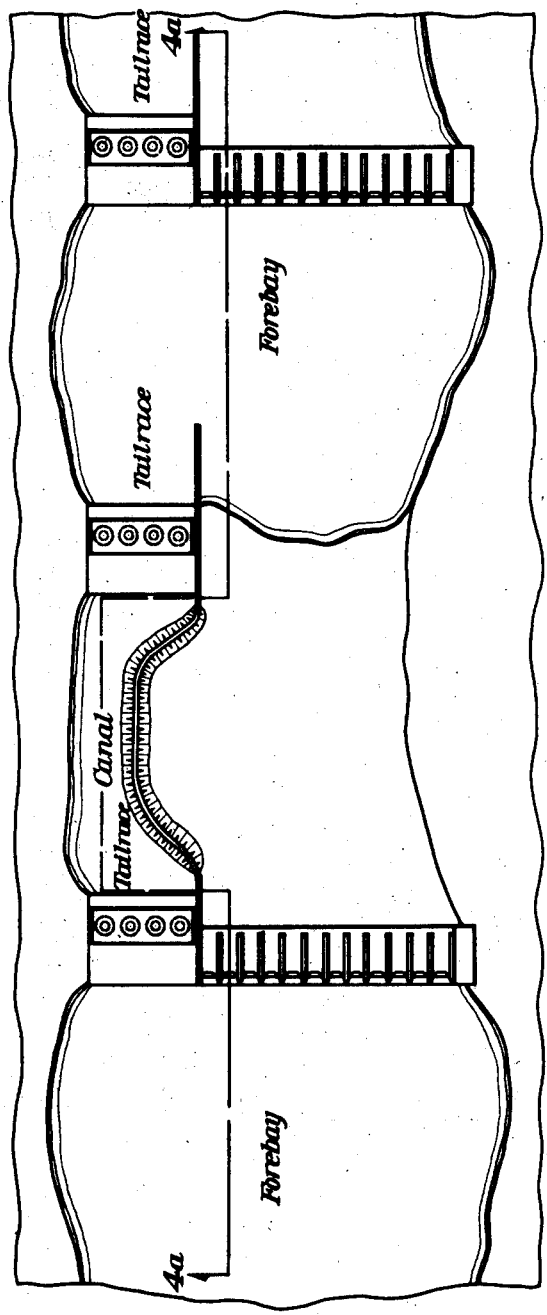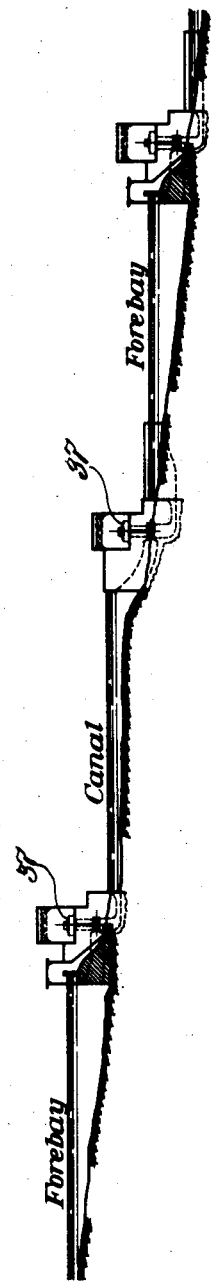
Fig. 4.
Fig. 4a.

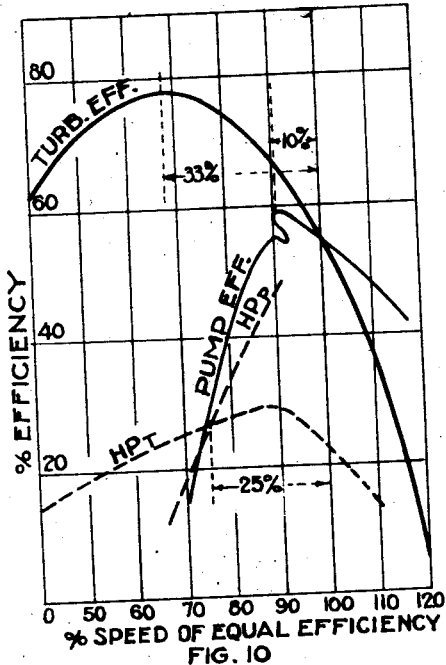
FIG. 10
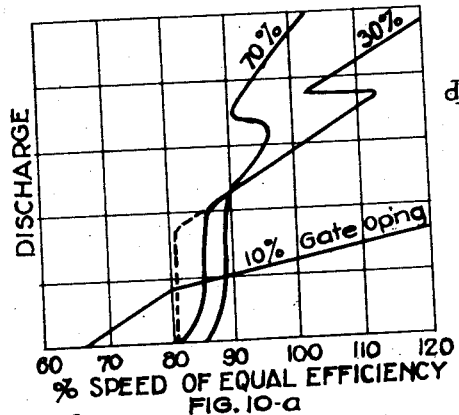
FIG. 10-a
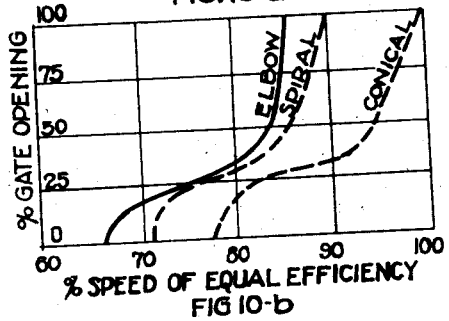
FIG 10-b
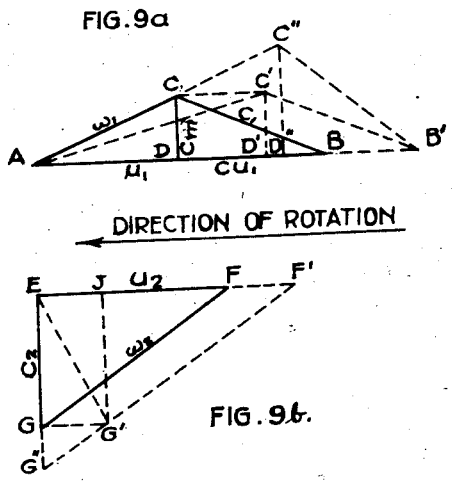
FIG. 9a
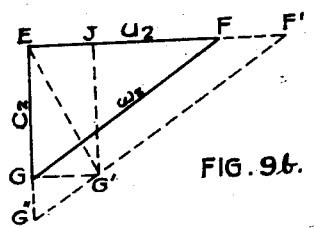
FIG. 9b.
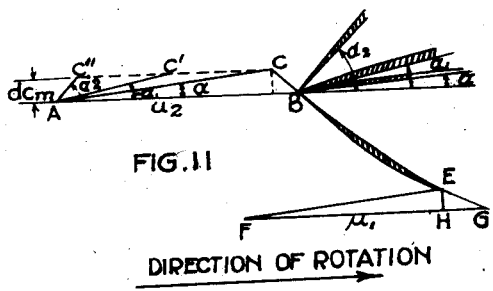
FIG. 11
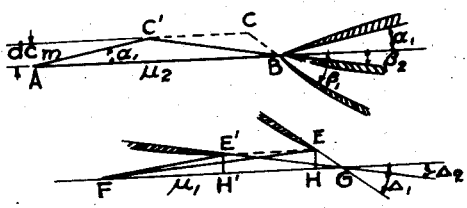
FIG. 11a
INVENTOR
F. A. Allner
BY
Thomas W. Y. Clark
ATTORNEY

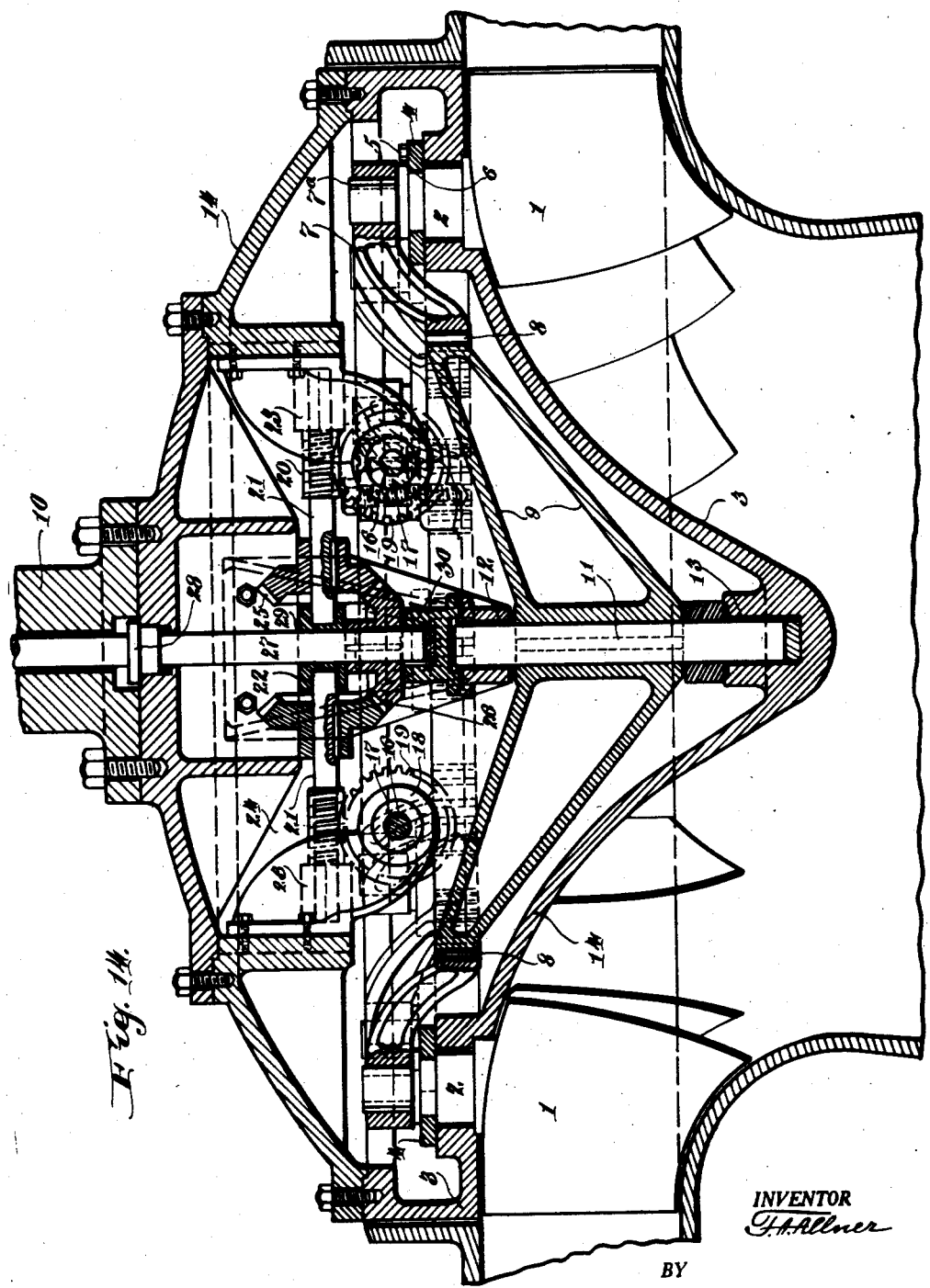

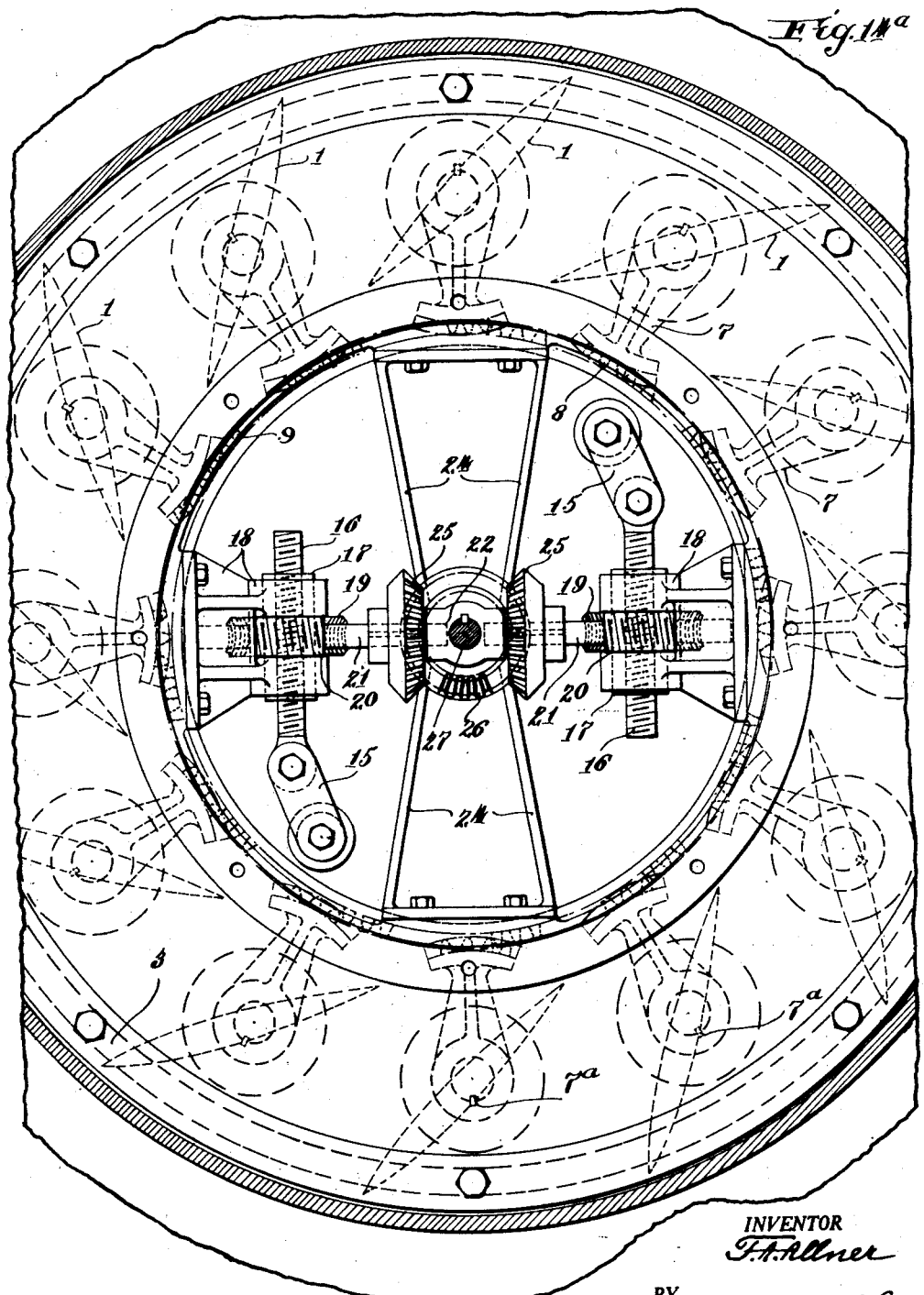

INVENTOR.
F. A. Allner
BY
Thomas W. J. Clark
ATTORNEY.

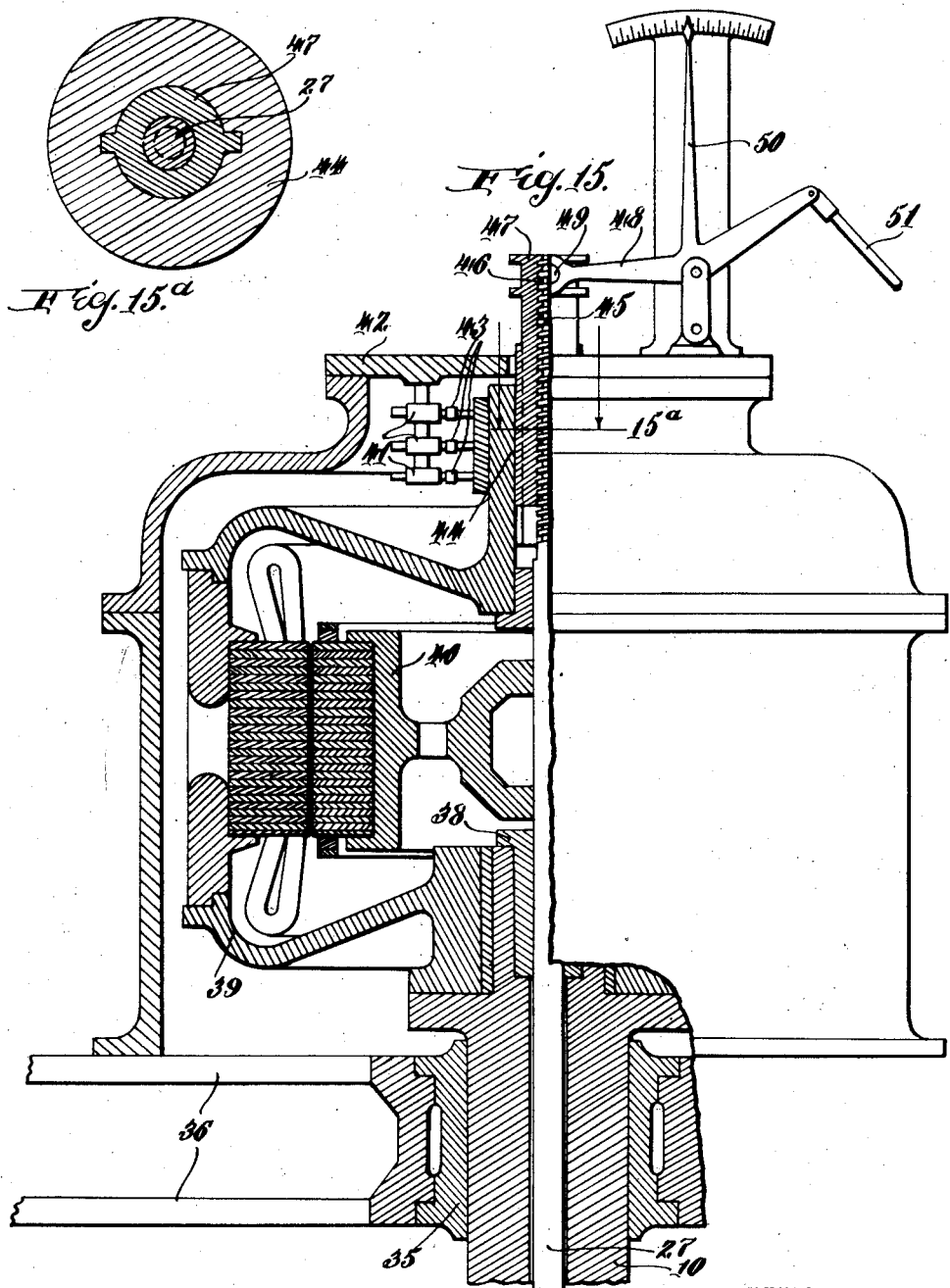

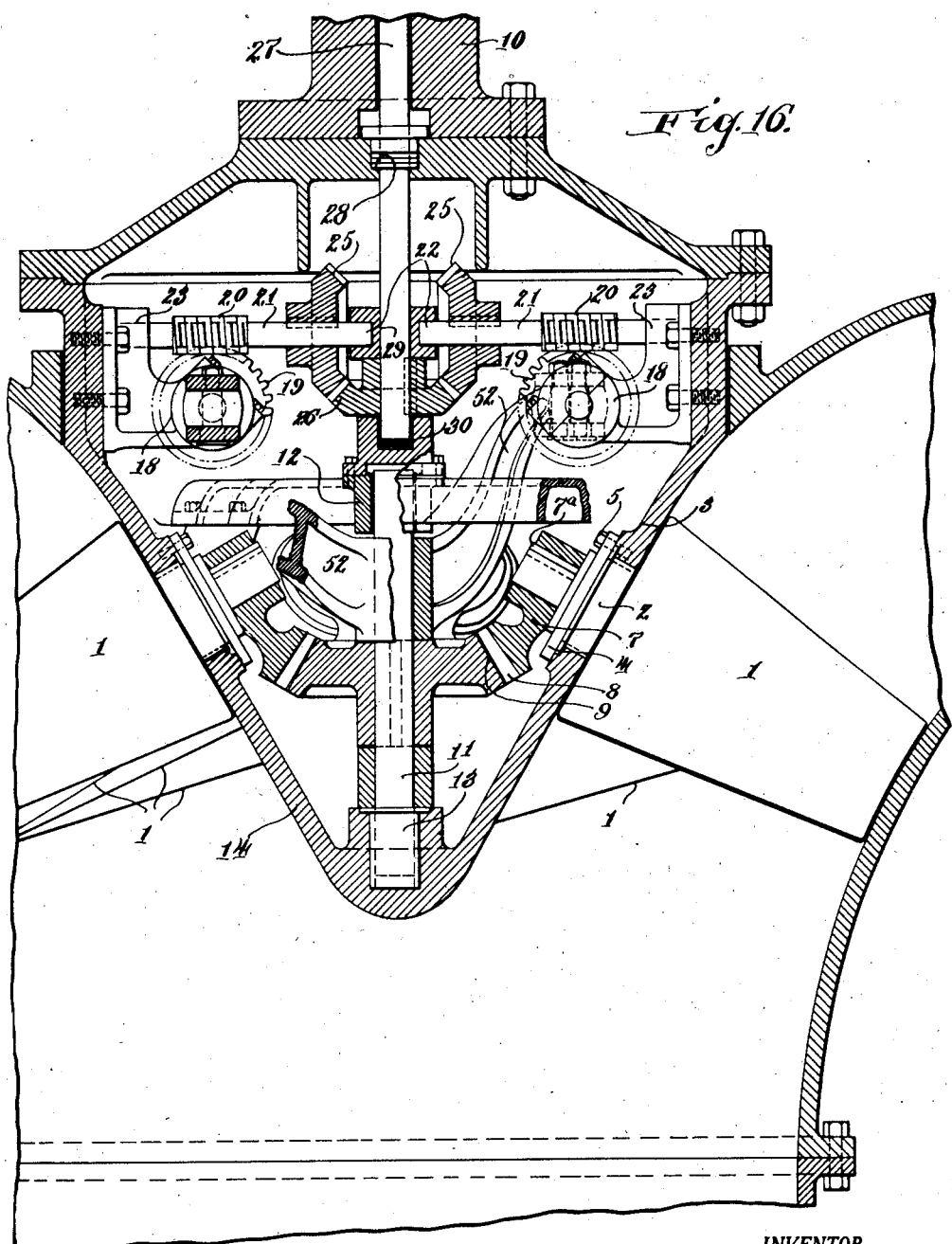

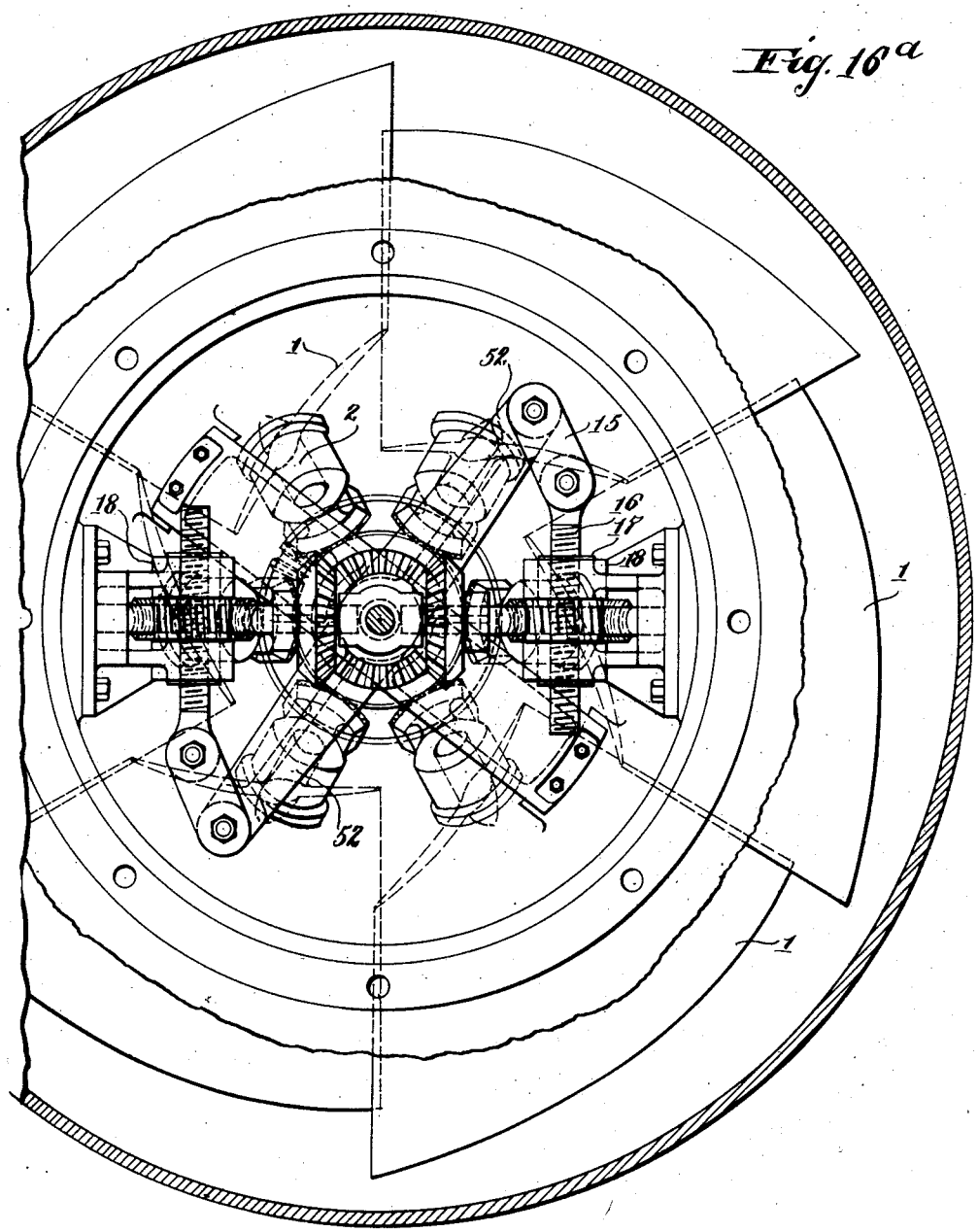

July 7, 1931.  F. A. ALLNER  1,813,107
METHOD OF AND MEANS FOR INCREASING THE USEFUL
LOW FLOW CAPACITY OF A HYDROELECTRIC PLANT
Filed Nov. 30, 1929   14 Sheets-Sheet 14
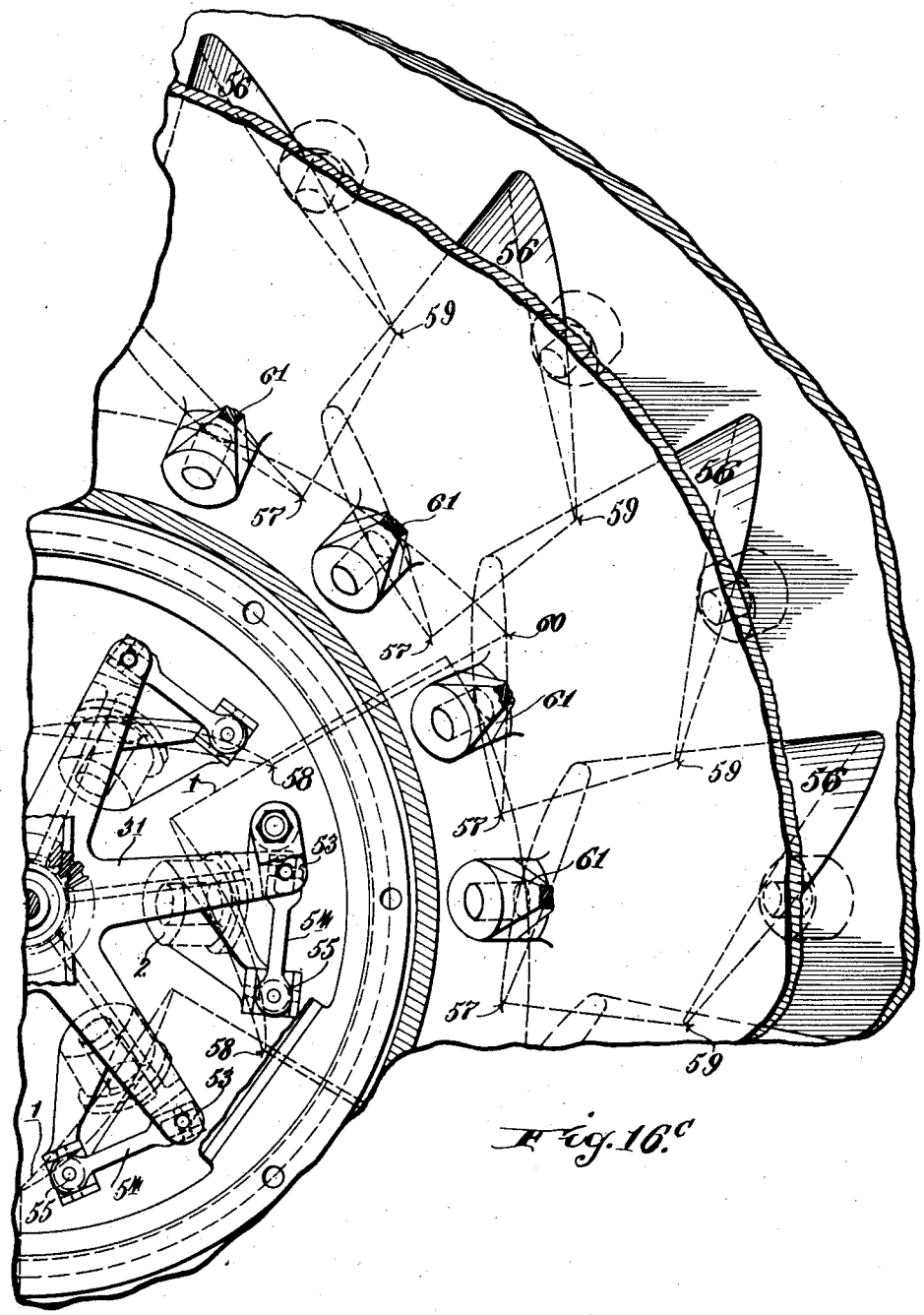
Fig. 16.ᶜ
INVENTOR.
F. A. Allner
BY
Thomas W. Y. Clark
ATTORNEY.

Patented July 7, 1931

1,813,107

UNITED STATES PATENT OFFICE

FREDERICK A. ALLNER, OF BALTIMORE, MARYLAND

METHOD OF AND MEANS FOR INCREASING THE USEFUL LOW FLOW CAPACITY OF A HYDROELECTRIC PLANT

Application filed November 30, 1929. Serial No. 410,818.

This invention refers to a new and improved method of and apparatus for increasing the effective capacity of a hydro-electric generating station in an interconnected steam and hydro-electric system during periods of low flow by converting low-cost off-peak electric energy, either steam or hydro, into hydro power capacity of high value, without the use of a storage reservoir at a level higher than that of the headwater pond of the hydro plant and without the use of pumps other than the hydraulic turbines. This is accomplished by operating a portion or all of the turbine generator sets at the hydro plant as motor driven pumping sets for pumping water from the tailwater pool into the headwater pond during the hours when this hydro plant is not generating, and subsequently discharging this water through the turbines during hours of generation, thus increasing the peak generation at the hydro plant.

A major object of the invention is to make economically feasible the development of water power on rivers with fluctuating stream flow and pronounced low flow stages by increasing the low flow capacity value with a minimum of additional investment and a relatively small amount of energy losses, incident to conversion of low cost off-peak energy into high value peak energy.

Another object of the invention is to increase the effective capacity available under minimum flow conditions at existing hydroelectric plants that now have machinery installed with capacity in excess of the present effective capacity usable under minimum flow conditions, and thereby increase the economic value of such plants.

Another object of the invention is to make profitable additions to the existing generating capacity at plants where all of the installed generating units are now usable as effective capacity under minimum flow conditions, this invention making possible an increase in effective capacity at low increment investment cost per unit of capacity and at small operating expense, and yielding at the same time additional energy output from the additional water-wheel capacity during high flow periods.

A still broader object of the invention is to accomplish a more perfect coordination of hydro and steam sources of power in a large interconnected system through establishing a more definite relationship of the ultimate best usage of the two sources of power, to develop the most suitable designs for any specific hydro-electric project forming part of an interconnected system, the most economical method of operating the hydro and steam plants for maximum capacity value, and a more comprehensive scheme of developing the remaining water power sites of this country, some of which it would not be economically feasible to develop at all without this invention.

Another object of this invention is to provide simple and efficient means for applying this method, either in existing plants at a small amount of investment, or in additions to existing plants, or in a more economical design of undeveloped water power sites.

Other objects and advantages will become apparent from the specification, taken in connection with the accompanying drawings, wherein the invention is embodied in concrete form.

Fig. 4 is a plan view of three water power plants located serially on the same river, the headwater level of one plant forming the tailwater of the next higher plant, the intermediate plant having no pondage, the upper and lower plants equipped with pondage.

Fig. 4a is a longitudinal section and elevation of the three water power plants shown in Fig. 4, on line 4a—4a of Fig. 4.

Fig. 9a is a group of velocity diagrams at entrance when the centrifugal pump of the characteristics shown in Fig. 9 is operated as turbine with and without movable guide vanes.

Fig. 9b is a group of velocity diagrams at exit when the centrifugal pump of the characteristics shown in Fig. 9 is operated as turbine with and without movable guide vanes.

Fig. 10 shows in curve form efficiency and capacity of a medium head Francis type turbine, functioning either as a turbine or as pump over a wide range of speed, operating under a constant head.

Fig. 10a shows in curve form relation of speed and discharge for a turbine of the characteristics shown in Fig. 10, when operated as pump at 10%, 30% and 70% gate opening.

Fig. 10b shows relation between gate opening and speed of impending delivery for a turbine of the characteristics shown in Fig. 10, when operated as pump either with a short elbow intake or with a spiral or with a long conical intake.

Fig. 11 shows velocity diagrams at entrance and exit for a turbine with movable guide vanes, when operated as pump near speed of impending delivery.

Fig. 11a shows velocity diagrams at entrance and exit for a turbine with adjustable rotor blades, when operated as pump near speed of impending delivery.

Fig. 14 is a cross-sectional elevation of a radial flow turbine with adjustable blades, suitable for operation as turbine or as pump.

Fig. 14a is a plan view of the rotor of a radial flow turbine, with the cover plate of the hollow hub removed.

Fig. 15 is a partial cross-sectional elevation of the upper portion of the main turbine shaft with control motor and blade position indicator.

Fig. 15a is an enlarged sectional plan view on line 15a—15a of Fig. 15.

Fig. 16 is a cross-sectional elevation of a diagonal flow turbine with adjustable blades suitable for operation as turbine or as pump.

Fig. 16a is a plan view of the rotor of a diagonal flow turbine, with the cover plate of the hollow hub removed.

Fig. 16c is a plan view of a diagonal flow turbine with adjustable blades showing link connection between blade arm and adjusting spider and showing also varying angle guide vanes.

In order to better illustrate the scope of this invention and means by which same is accomplished, a brief review of recent trends in power development and of the chief economic considerations underlying the most effective use of different sources of power will be necessary.

Figure 1:
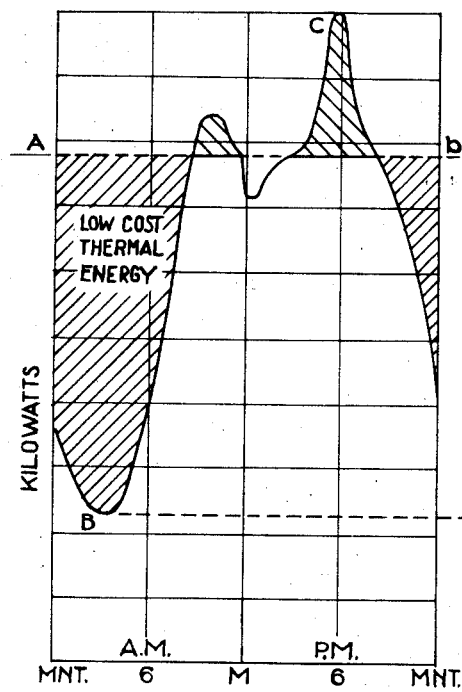
Fig. 1 is a typical load diagram for a day of heavy load on an electric power system, supplied with steam and water power, showing also the distribution of load between the two sources of power at times of minimum natural river flow at the water power plant.

The high investment cost of modern steam plants and the demand of industries to secure the lowest possible rates, are gradually replacing the formerly isolated local power systems by large interconnected networks, comprising a number of thermal plants, water power plants and long distance transmission systems. The load demand on such a system varies a great deal during the different hours of the day and during the days of the week and different seasons of the year but, on the whole, these variations can be fairly well anticipated and are more or less regular. For example, during the hours between 11:30 p.m. to 6:30 a.m., the load demand is only a small fraction of the load requirements during the day hours on weekdays when the factories are running and when railways move traffic. A typical daily load curve is shown in Fig. 1, referring to the period of the year when the day peaks are nearly the highest of the season and when in the years of low rainfall the river flow may be near to the minimum that ever occurred in previous low flow periods. The lowest load of the day occurs early in the morning, around 3:00 a.m., as indicated by point B in Fig. 1; the highest load or peak of the day occurs between 5:00 and 6:00 p.m., as indicated by point C in Fig. 1.

Very few such load systems obtain their entire requirements from water power alone, and the great majority supply their load requirements with power generated partly by water, partly by steam and internal combustion engines. The most effective way of utilizing water power developments, subject to wide variations in available water supply, in the interconnected load system is to let the hydro source of supply furnish the base portion of the load during the wet seasons when there is ample flow and the output of the plant is limited not by flow but by installed generating capacity, and let the thermal plants carry the peak portion of the load. During the low flow season this distribution is reversed, i. e., the output of the water power plant, which is greatly reduced below that available during the wet season, is carefully distributed into the peak portion of the load curve so as to furnish the greatest capacity service with the limited amount of energy, whereas the thermal plants operate on the base portion of the load.

Figure 2:
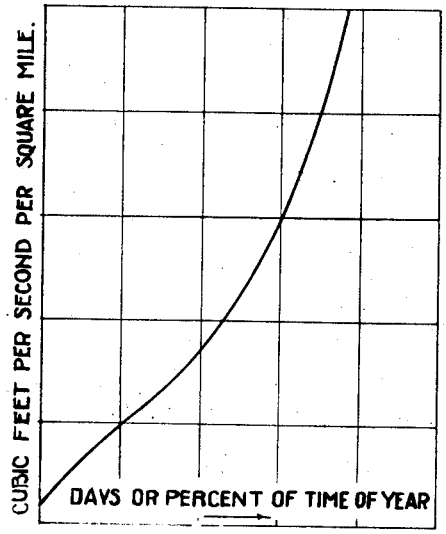
Fig. 2 is a typical hydrograph in the shape of a summation curve, showing the run-off in cubic feet per second per square mile of drainage area in relation to the number of days in the average year that such run-off is available.
Figure 3:
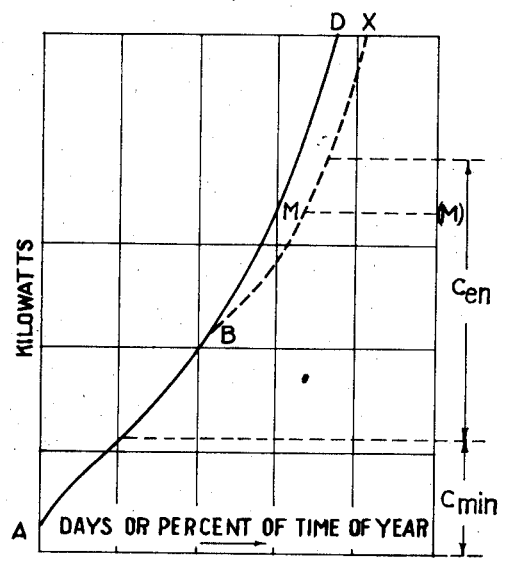
Fig. 3 is a diagram showing the average amount of hydro-electric energy that is available from a hydro plant located on a river with run-off conditions, as per Fig. 2, and also that portion of the energy that is usable on a load system corresponding to Fig. 1.

Fig. 2 is a typical yearly hydrograph representing average run-off in cubic feet per second per square mile of drainage area. Fig. 3 is the same typical hydrograph shown in Fig. 2, redrawn to a kilowatt scale for a given head and plant efficiency. The line ABD in Fig. 3 gives the 24 hour power available from natural inflow. Using the typical daily load curve of Fig. 1, the line ABX of Fig. 3 can be drawn representing the usable energy. Available and usable power are the same up to point B of Fig. 3, corresponding to point B, the lowest load of the day in Fig. 1. The horizontal distance between the lines BD and BX is potential energy wasted during the hours of low energy requirements.

For any given water power site the maximum energy that may be obtained in an average river year will be approximately proportional to the head, drainage area and run-off per square mile, independent of the amount of generating capacity installed, as long as there is not sufficient flow to operate the entire installed machinery at full capacity. This is the low flow period indicated on the left portion of Figs. 2 and 3. When there is more water in the river than can be converted to electric power by the installed generator capacity and utilized in the load systems, i. e., during the high flow period, the maximum available output of the plant will remain practically constant, as indicated by the horizontal dotted line M(M) in Fig. 3, except that at times of very high flood stages a reduction of head will usually be experienced, which has a tendency to reduce the available output during a few days of the year, represented by the extreme right portion of Figs. 2 and 3.

On pondage equipped hydro plants the power will be drawn at a steady rate during the 24 hours, as far as it can be used by the load, only during the high flow period. During the low stages of the river and especially at times of minimum flow, the water will be discharged through the power house during the hours of heavy load demand only, so as to render the greatest capacity service to the system within the limits of the available hydro energy as indicaed in the cross-hatched areas at the top of Fig. 1 above the horizontal line Ab.

For a given amount of minimum flow hydro energy this capacity service will be the greater the steeper the peaks of the load system. During the hours when the hydropower plant is not operated, a large amount of low cost thermal energy could be generated if needed and employed for pumping, as indicated in the cross-hatched areas of Fig. 1 below the dividing line A*b*. As most of the power systems that are served in part by water power plants have now large capacity interconnections with adjacent systems, some of which are served entirely by steam plants, it will be possible in many cases to secure a larger amount of low cost thermal energy during the off-peak hours than indicated by the cross-hatched area of Fig. 1, and use such energy for pumping purposes at the hydro plant. The total amount of such pumped energy will then be limited by the capacity of transmission lines and transformers connected to the hydro plant, or by the motor input of the pumping sets, whichever is lower.

Figure 5:
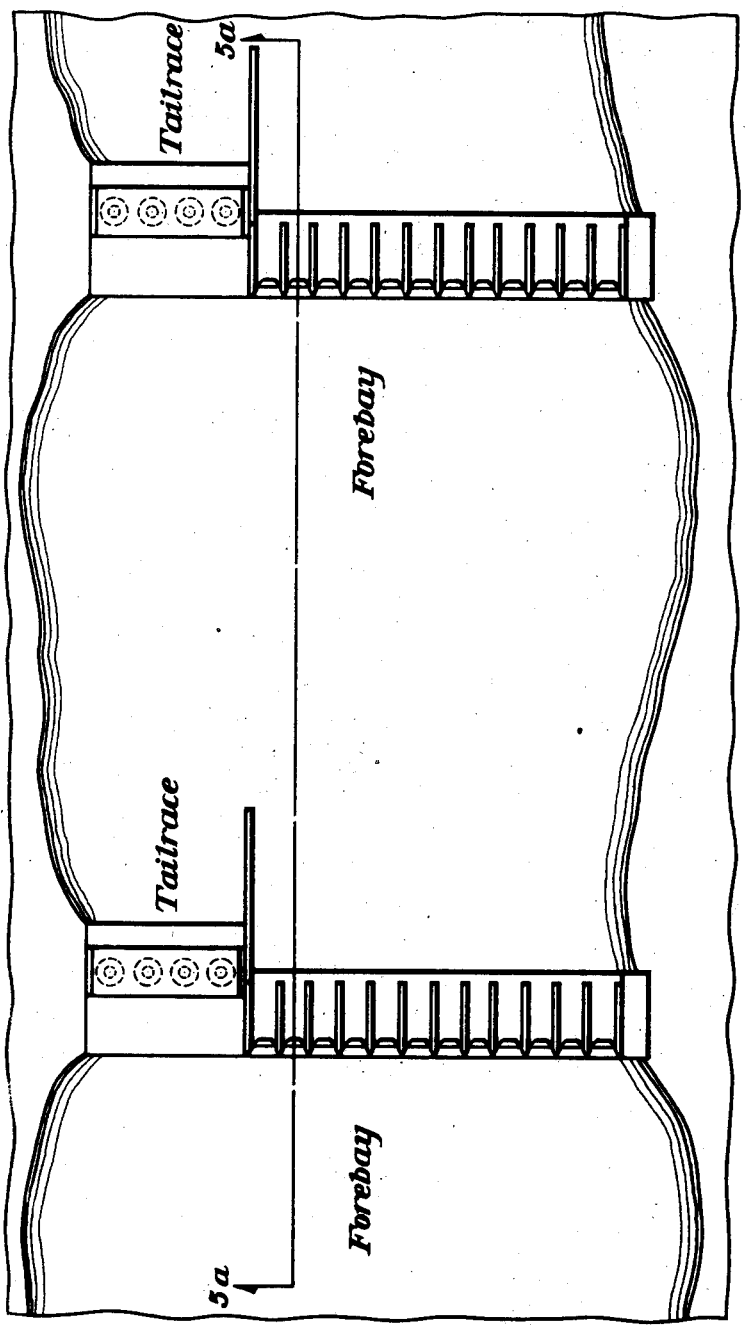
Fig. 5 is a plan view of two pondage equipped water power plants, located on the same river, the headwater level of the lower plant forming the tailwater of the upper plant.
Figure 5A:
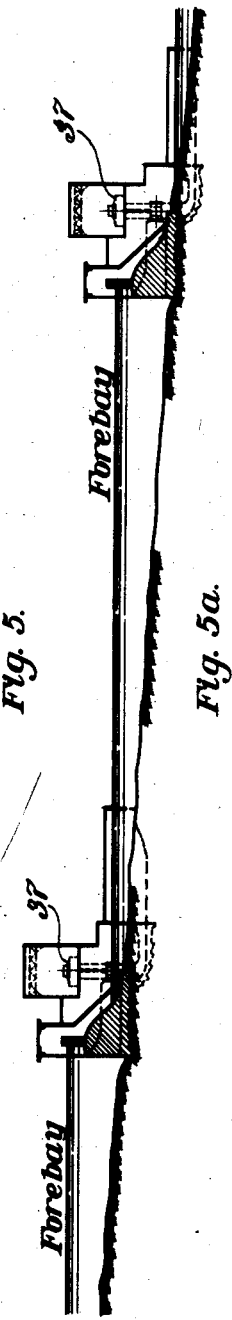
Fig. 5a is a longitudinal section and elevation of the two water power plants shown in Fig. 5, on line 5a—5a of Fig. 5.

Figs. 4 and 4*a* are an example of three plants in series on the same river, the tailrace of each upper plant forming the headrace of the next lower plant. The uppermost and lowest plants are assumed to have considerable pondage, whereas the pool formed by the dam of the intermediate plant is assumed to be small, being not more than the surface of the headrace canal. Modern dam structures, equipped with regulating gates for the discharge of flood waters, often have a few feet of free-board for the purpose of avoiding spilling of water due to wind at normal operating level. The dams which are not designed with such flood gates can be easily equipped with flashboards or other temporary crests at very small cost. These temporary crests need be maintained only at times of very low river flow and can be readily removed during higher stages of the river. Figs. 5 and 5*a* are an example of two plants in series on the same river.

The plan of operation contemplated under this invention will be to discharge, at times of very low river flow, a greater amount of water from the two upper plants than the natural inflow; to accumulate this excess discharge in the pond of the lowest plant, the latter, however, discharging only the natural inflow. During the off-peak hours when none of the hydro plants is generating, I propose to use the otherwise idle generating machinery of the two upper plants as pumping machinery to lift the water, discharged in excess of natural inflow during the generating period, from the lower ponds back to the pond of the uppermost plant. The power necessary for this pumping operation is secured from the otherwise unused but available capacity of the thermal plants or of water power plants, having excess flow, forming part of the interconnected power system.

Under average conditions power will be available for pumping during six to eight hours on week days and approximately during the whole twenty-four hours on Sundays. If the ponds are sufficiently large, it will be possible therefore, to operate instead of on a daily cycle of generation on a weekly cycle, thus increasing in effect the daily excess discharge by an amount equal to approximately one-sixth of the water that can be pumped back during the twenty-four hours of Sunday operation.

A large part of the investment in water power plants consists of the costs of dam, property, relocation of railroads, bridges, highways, etc., i. e., a fixed amount, independent of the number of generating units. The increment cost per kw. of installed capacity, including the pro-rated cost per kw. of transmission lines and tie-in equipment, but exclusive of the fixed cost for property, dam and other hydraulic structure, is usually lower than the increment cost per kw. of additional steam capacity.

Heretofore, it has been the practice to install hydro-electric capacity for a relatively small run-off per square mile, the upper limit of capacity being approximately determined by the economic balance between annual charges on the hydro investment and the useful hydrocapacity under minimum flow conditions, at the equivalent cost per kw. of steam investment, plus the energy value on the basis of steam costs of that amount of hydro-output which is obtainable by the total installed capacity.

The purpose of this invention is to greatly increase on pondage equipped hydro plants, located serially on the same river, the useful capacity obtainable from such hydro plants at times of minimum flow. In order to obtain the greatest economic benefit from this invention in the case of undeveloped water power sites, it will, therefore, be necessary to determine in advance the limiting conditions that are imposed by certain natural characteristics of a given development.

These limitations are influenced largely by a number of factors, any one of which may control the upper limit at which regeneration ceases to be profitable; the factors are:

(1) Capacity of pondage, available for regenerative operation.

(2) Amount of pumping power and number of pumping hours during each cycle.

(3) Relation of power input when pumping to power output when generating, i. e., efficiency of regenerative conversion.

(4) Relation of increment cost of additional hydro capacity, including transmission investment, to increment cost of steam capacity.

(5) Relation of the duration of deficiencies in flow to the duration of high flow stages usable by the additional capacity installed, i. e., the relation between energy consumed in high flow.

(1) The water discharged into the lower pond in excess of the natural inflow will cause a lowering of the water level in the upper pond and a raising in the lower pond. The decrease in the upper plus the increase in the lower pond represents the reduction in head, under which the upper plant will operate at the end of the drawdown period. The lower plant will operate during the whole drawdown period at a gradually increasing head, the maximum at the end of the drawdown period being equal to normal operating head plus the maximum rise in the lower pond. Thus, there will be on the average a lowering in the combined effective operating head of the two plants, i. e., a reduction in output from natural inflow alone, below that obtainable from the same water under normal head conditions.

Assuming that there will be no physical limitations, other than those controlled by practical operating conditions, along the shores of the lower pool (railroads, highways, buildings, etc.), or at the power house structure itself, we may expect that the excess drawdown may be carried to a point, where either an excessive lowering of head renders turbine operation at the upper plant too inefficient or impractical or where the increased capacity at the lower plant would overload the generators. The limit will probably be first reached at the upper plant and approximately at that head which is the capacity controlling one at times of very high flood stages. Under average conditions this maximum practical reduction of head will be of the order of approximately 40%. Instead of expressing this useful pondage in absolute terms of million cubic feet or in cubic feet per second average flow during 24 hours, I will refer to it henceforth in relation to minimum natural inflow, calling the ration between the two (X), which will have a bearing on the net gain of energy that can be secured over a wide range of pond ratios, i. e., relation of upper pond area to lower pond area.

This net gain N in kwh. is independent of the head at the lower plant. I express same in the following general equation:

$$N = f_n h_1 \left[ (X) - \frac{(X)(Y)}{2} - \frac{(Y)}{2} \right] + f_n \frac{d_2}{2}$$

in which:
$f_n$ = kwh. during 24 hours of minimum natural inflow at one foot head.
$h_1$ = normal head at upper plant.
$f_n h_1$ = kwh. during 24 hours of minimum natural inflow at normal head of upper plant.
(X) = ratio of usable pondage to natural inflow.
(Y) = ratio of upper level drawdown $d_1$ plus lower level rise $d_2$ to normal head at upper plant.
$d_2$ = maximum rise at lower pond.

For a maximum practical (Y) or 40% and different ratios of (X) from 1 to 5 and three assumed pond ratios (unlimited upper pond, both ponds of same characteristics, lower pond unlimited), I found the following percentages of net gain, i. e., relation of kwh. obtainable by pondage under drawdown conditions to kwh. obtainable by the same amount of water if both ponds were of unlimited capacity.

| (X)= | 1 | 2 | 5 |
|---|---|---|---|
|  | Per cent | Per cent | Per cent |
| Unlimited upper pond | 80 | 80 | 80 |
| Upper and lower pond identical | 70 | 75 | 78 |
| Unlimited lower pond | 60 | 70 | 76 |

(2) It is evident that regardless of the amount of regenerative pondage that may be available at a water power site, at practically no increase in investment costs, only such portion of it can be employed for purposes of additional hydro generation during peak hours as can be refilled by pumping during the off-peak hours. Where the usable pondage is relatively small, perhaps equal to or smaller than the natural inflow, it will usually be possible in the cases that I have investigated, to employ the entire pondage for regenerative purposes even at comparatively low conversion efficiencies.

In the great majority of other cases, however, a preliminary investigation will be necessary to determine the approximate amount of available regenerative pondage that can be made use of by reason of limitations in pumping capacity and available pumping energy. The maximum amount of water that can be lifted back by pumping in the case of a power system that has no interconnection with neighboring systems, will be limited by the following conditions:—

Capacity of generators when operating as motors;
Amount of off-peak thermal energy;
Average efficiency of conversion.

Figure 1A:
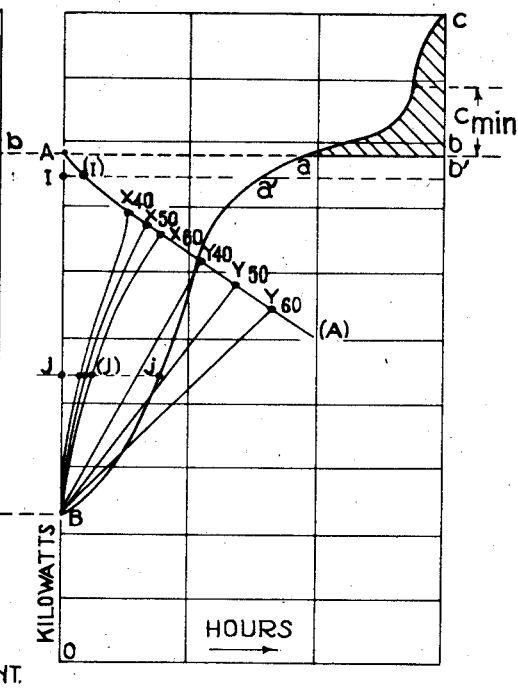
Fig. 1a is a load diagram for the same day as Fig. 1, drawn as summation curve and having auxiliary curves drawn in which indicate the gain in useful capacity that is obtainable by this invention at times of minimum river flow.

I worked out a simple graphic method in Fig. 1a on the example of load curve of Fig. 1 for three assumed values of conversion efficiencies, 40%, 50% and 60%. In Fig 1a the cross-hatched upper portion of the load curve (developed as a summation curve from Fig. 1) represents the amount of peak load supplied by the two hydro plants at times of minimum natural inflow. The upper plant contributes the amount of $C_{min}$ as useful capacity. We may also assume that a certain amount of additional capacity $C_{en}$ will be provided, justified by its energy yield during high flow and by certain considerations of reserve capacity during highest flood stages, etc. The task is to determine the amount of further capacity $C_p$, justified by regenerative pondage.

At point A on the left side of Fig. 1a I plotted a curve which, in horizontal distance from the line OA to the right, equals the load area for any point below $ab$. Thus, for point I, lying a certain amount of kw. below A, the horizontal distance I(I) equals the load area in the trapezoid area $a—b—b'—a'$. I also plotted from point B, which represents the minimum load at any time of the day, a similar curve drawn to the same scale as the curve plotted through A as a starting point, the horizontal distance of which, at a given vertical distance above B, is equal to the assumed conversion efficiency times the area at the left of the load line. Thus, for an arbitrary point J the horizontal distance J(J) equals the area JjB times the conversion efficiency. Three values of conversion efficiency have been assumed, 40%, 50% and 60%. I thus obtain three curves, starting at B and extending in an upward right direction and intersecting with the curve that started at point A in a downward direction to the right. The vertical distance from these points of intersection to the horizontal line going through A, is a measure of the additional capacity that can be made use of during minimum flow for the three different conversion efficiencies assumed. The vertical distance from these same points of intersection down to a horizontal line drawn through point B is a measure of the motor input necessary for pumping. The horizontal distance from these points of intersection, $X_{40}$, $X_{50}$ and $X_{60}$, to the vertical line AO is a measure of the additional peak generation that can be supplied to the system at the conversion efficiency of 40, 50 and 60%, respectively.

By recalculating this electrical energy in terms of cubic feet, under proper assumptions of efficiency of generation, average head, etc., I can determine with a fair degree of accuracy the amount of pondage necessary for this additional discharge of water for the different conversion efficiencies assumed.

A further check may be made as to the adequacy of motor capacity available for pumping. As the curves show clearly that the lower the efficiency of conversion the greater the motor input, and the lower the additional useful peak service, I need investigate only conditions of greatest pump motor capacity, i. e., lowest efficiency, and make sure that even for that condition the generator capacity $C_{min}$ plus $C_{en}$ plus the regenerative capacity or gain due to pumping $C_p$, will furnish sufficient motor capacity. As generating equipment is designed for power factors of from 70 to 90%, on the average approximately 85%, whereas motors can be operated at unity power factor we would expect to find in most cases sufficient motor capacity available. If, however, the load curve at point B should be relatively low, whereas point A lies rather high, it may be possible that for some of the lower efficiency curves a correction must be made, starting from B, to take into consideration the limited pumping capacity.

In the case of a power system that has large capacity interconnections with neighboring systems, the amount of low cost off-peak thermal energy available for pumping need not be limited to that originating on the power system for which the load curve of Fig. 1a is drawn. It will be possible then to disregard the area above the load curve, starting at point B as a limiting factor of available pumping energy and instead merely check up at what distance $C_p$ below horizontal line $Ab$, a point can be located on load integration curve A(A), where the product of the hours of pumping times $$\frac{C_{min}+C_{en}+C_p}{.85}$$

times conversion efficiency will approximately equal the horizontal distance of that point from the vertical line OA. These new points of intersection with curve A(A) are $Y_{40}$, $Y_{50}$ and $Y_{60}$ in Fig. 1a, the vertical distance upward to horizontal line $Aa$ representing the gain in useful capacity $C_p$, made available by regenerative pumping on a power system having large capacity interconnections with neighboring systems.

(3) The third factor next in importance, having a bearing on the extent to which it is practically possible and economical to apply my invention and install additional generating capacity of the dual service type for exploitation of pondage, is the efficiency of conversion. This will be the product of several individual efficiencies, viz:

|  | High | Low |
|---|---|---|
|  | Per cent | Per cent |
| (a) Transmission from thermal plants to low tension bus of hydro plant | 95 | 85 |
| (b) Generator, operating as driving motor at unity power factor | 97 | 95 |
| (c) Turbine, operating as pump | 85 | 60 |
| (d) Starting and stopping | 97 | 90 |
| (e) Slope of pond, head loss through racks, etc., when pumping | 99 | 97 |
| (f) Slope of pond, head loss through racks, etc., when generating | 99 | 97 |
| (g) Turbine | 90 | 80 |
| (h) Generator | 96 | 94 |
| (i) Transmission from hydro plant to low tension bus of thermal plants | 95 | 85 |
| Product of all efficiencies (a) to (i) incl | 61.1 | 26.2 |
| Product of efficiencies (b) to (h) incl | 67.7 | 36.3 |

As the load curve in Figs. 1 and 1a has been stepped up by the transmission losses, the combined efficiencies of 67.7 to 36.3 represent the probable range of overall efficiencies to be considered. For the other investigations of limitations (4) and (5), however, the transmission losses (a) and (b) must be taken into account.

(4) The increment cost per kw. of hydro capacity including transmission and tie-in investment and adjustment for loss in transmission, may vary over a much wider range than the cost per kw. of steam capacity. This is due to the great variations possible in the distance of transmission, differences in head, etc. However, even for low head plants of approximately 50 ft. fall, and for distances not in excess of 100 miles the increment cost of hydro capacity may still be well below the cost of steam investment. The rate of depreciation on hydro structures and machinery is only about one half or less of the average rate of depreciation on steam investment. Also taxes at the hydro plant, on account of location in rural districts, are usually lower than those on steam plants, located close to the city load centers. The annual fixed charges on investment may, therefore, be less per increment kw. at the hydro plant than at the steam plant, even though the investment per kw., itself, is higher.

In the several cases that I have investigated, the comparison of annual fixed charges on increment investment costs seemed to indicate a comfortable margin in favor of hydro capacity. For the purposes of this present description, I will assume an approximate balance of investment charges, although each individual case should be carefully analyzed in that respect, as a large differential in favor of the hydro investment has a tendency to make fullest utilization of usable pondage profitable, whereas only a limited degree of pondage utilization is warranted in cases where the carrying charges on steam investment are lower than those on hydro capacity.

(5) The fifth and last factor of some importance as far as economic limit of regenerative pondage is concerned, refers to the relation between energy loss caused by pumping and energy gain during high flow solely due to additional dual use capacity. How this limiting condition, i. e., the extent to which it is still economical in a specific case to increase installed capacity, can be readily determined, I have shown, by means of energy diagram, Fig. 3, in combination with the results obtained from Fig. 1a.

Figure 6:
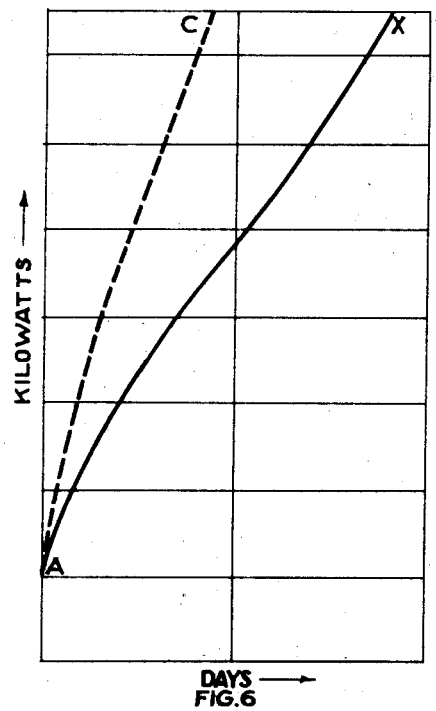
Fig. 6 is a larger scale reproduction of the low flow section of energy diagram of Fig. 3, showing also relationship between 24 hour capacity and equivalent days of energy deficiency at that capacity.

Fig. 6 is a larger scale reproduction of the low flow portion of the energy diagram shown in Fig. 3, the vertical distance from the horizontal base line of the points along the curve AX representing the twenty-four hour power available from natural inflow, and the horizontal distance from the vertical base line representing the number of days on which there will be a deficiency in the amount of power available from natural inflow. By calculating the area of power deficiency lying above A, and expressing same in number of equivalent days of largest deficiency, I can draw a curve with A as starting point representing the accumulated days or cycles of maximum power deficiency, indicated by curve AC. From previous studies shown on Fig. 1a, I can obtain a certain relationship between the additional hydro energy, available from pumped water by a given amount of gain in useful capacity due to pumping, $C_p$, within a range of conversion efficiencies from 40 to 60%.

Figure 7:
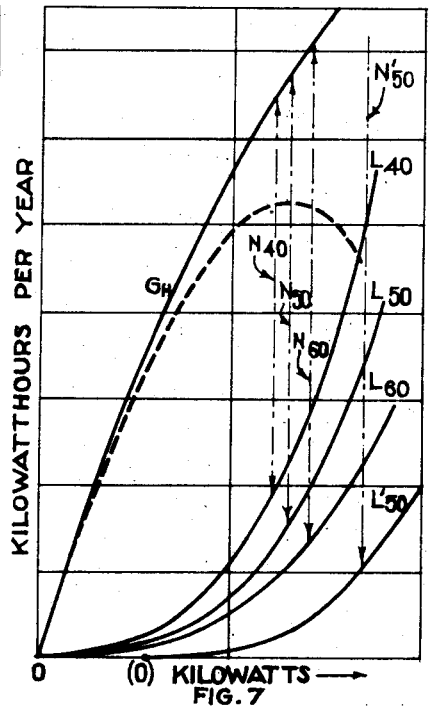
Fig. 7 is a group of curves showing a method of determining the economic relation between increased capacity value of a plant, energy gain in high flow and pumping energy loss in low flow.

The conversion losses during each cycle of operation for a given amount of useful capacity gain, $C_p$, represented by the vertical distance from the horizontal line Aa to the line A(A), I have computed from values obtained from Fig. 1a. The horizontal distance from this same point on the A(A) line to the vertical line OA is the daily energy available from pumped water. This energy value times $$\frac{1 - \text{Efficiency}}{\text{Efficiency}}$$

gives the conversion losses per cycle. The annual conversion losses are the losses per cycle times the number of equivalent days or cycles that $C_p$ can be utilized by the pumped water. The number of equivalent days or cycles are taken from the curve AC of Fig. 6. The annual conversion losses for efficiencies of 40 to 60%, represented by curves $L_{40}$, $L_{50}$ and $L_{60}$, respectively, are redrawn in relation to $C_p$ on Fig. 7, $C_p$ being the horizontal scale in kw. and annual conversion losses in million kwh. the vertical scale.

From the energy diagram, Fig. 3, I can determine the average yearly energy gain during the high flow period for any value of additional capacity $C_p$, made useful by pumping. By the intersection point of this curve of high flow energy gains, $G_h$ in Fig. 7, with the loss curves, $L_{40}$, $L_{50}$, and $L_{60}$, I establish the limits of $C_p$, at which the annual high flow energy gains are approximately equal to the annual pumping losses. However, the maximum energy gain will be for that value of $C_p$ where the annual high flow energy gain minus the annual pumping losses is a maximum. I have indicated these values of $C_p$ in Fig. 7 as $N_{40}$, $N_{50}$ and $N_{60}$ for the three pumping efficiencies.

In the above I have tacitly assumed that the value per kilowatt-hour of high flow supply during the peak hours is approximately of the same order as that of the energy input during the pumping hours, which if a certain allowance is made for transmission losses, probably corresponds to average conditions. It may be justified in some cases, especially on systems where it is customary to provide in the steam investment program for a substantial percentage of reserves in excess of the minimum necessary steam capacity under extreme low flow conditions, to make a certain allowance for the probability that during a portion of the extreme low flow period some of these reserves may be available for assisting in peak load generation and thereby make pumping operation unnecessary during part of the low flow period. This can be graphically evaluated in the diagram of Fig. 7 by shifting the loss curves to the right by an amount that is approximately equal to the percentage reserve of the minimum necessary steam capacity which may be expected to be available on the average during the low flow period. I have illustrated this on Fig. 7 only for the loss curve at 50% conversion efficiency, $L'_{50}$, and not for the others. The zero point of the loss curve, $L'_{50}$, has been shifted back from point O to (O), approximately equal to 10% of the minimum necessary steam capacity as determined in this particular case from load curve of Fig. 1. This assumption has a tendency to increase the amount of annual net gain to $N'_{50}$ and to appreciably increase the useful generating capacity $C_p$ that may still be justified from the point of view of high flow energy gain and low flow conversion losses.

In the above disclosure I have outlined a novel and systematic procedure for determining certain practical and economic limits, which should be investigated in order to make best use of this invention in the design of undeveloped water power sites. This by no means exhausts the possibilities of the application of this invention and any one familiar with the art of hydro-electric development and power system planning may secure substantial benefits from this invention by applying some features of it to existing plants at the cost of only minor alterations or additions to existing power plant facilities.

Heretofore it had been considered essential in all cases where low cost off-peak energy had been converted by means of hydraulic storage into high value peak energy, to employ a high level reservoir, especially constructed for that purpose, or to employ special pumps for lifting the water (as distinguished from the turbines for using the water) or to do both. In nearly all cases a relatively high head was considered essential and the cost of the reservoir and water conduits constituted the major part of the costs of such storage plants, because at the relatively high heads the cost per kw. of the hydraulic and electric machinery was relatively small. This invention will make it possible to dispense with specially constructed high level reservoirs and water conduits. It will also make it unnecessary to employ specially built pumping sets as the equivalent function can be performed by suitably designed dual use hydraulic machines as will be further described in the disclosure. It is not possible to operate at quite as high an efficiency when pumping with such dual use hydraulic machines which are primarily designed for efficient and large capacity generation as turbines, as in the case of those storage plants where specially designed pumps are employed, that are not used as turbines.

High efficiency of pumping is essential in those specially designed storage works because the pumping and generating cycle is repeated nearly every day, or at least during a large portion of the year. In the case of a run-of-river development with widely fluctuating stream flow, to which this invention is primarily applicable, pumping is necessary only a small portion of the time and high pumping efficiency is not as essential as in those other specially designed, more or less regularly functioning pumped storage plants. As this invention contemplates the use of dual purpose hydraulic machines at only slight additional expense over the cost of single purpose generating units and with only a nominal, if any, increase in the cost of hydraulic structure, and without any cost whatever for specially constructed reservoirs, the gain in useful capacity will be practically all net gain.

Rather than strive for hydraulic machines that will be very efficient for pumping, but will have low capacity and efficiency when generating, I endeavored to develop several types of dual use hydraulic machines which have practically the same efficiency and capacity, when operating as a turbine, as the best types of modern turbines on the market, but which will be so designed that they will assuredly pump at a moderately reduced efficiency over the whole range of heads against which they have to lift water during the pumping period.

For the past several years I have made experiments with several types of pumps operating as turbines, and with several types of turbines operating as pumps against the same heads over a wide range of speed and discharge. In so far as I have been able to find out neither the Francis nor other types of turbines have ever been operated as dual use machines. I have also not been able to find any record of centrifugal pumps ever having been operated as turbines and their characteristics determined over a wide range of head and speed. I consider it, therefore, of importance to include in this disclosure an outline of the various test results with a proper theoretical interpretation of the peculiar characteristics observed during these experiments.

Figure 8:
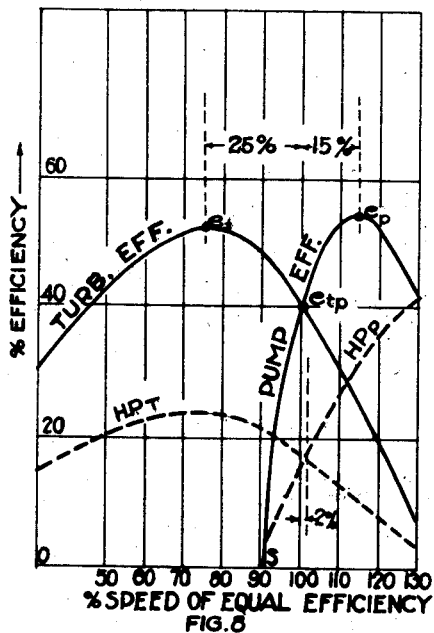
Fig. 8 shows in curve form efficiency and capacity of a six stage high head pump of low efficiency, functioning either as turbine or as pump over a wide range of speed, operating under a constant head.
Figure 9:
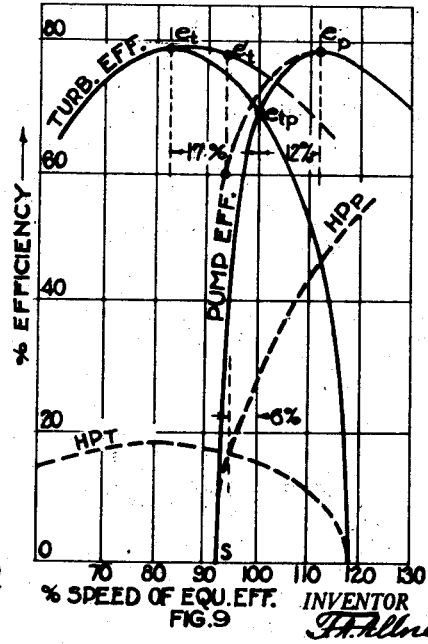
Fig. 9 shows in curve form efficiency and capacity of a single stage Francis type low head pump, of medium efficiency, functioning either as turbine or as pump over a wide range of speed, operating under a constant head.

One of the fundamental discoveries in the course of these experiments was that a centrifugal pump, no matter how low its efficieny due to friction, shock losses, leakage, etc., will give practically the same efficiency when operating under the same head as a turbine as when operating as a pump, but at reduced speed and output. Fig. 8 shows the results of tests on a six stage centrifugal pump when operated under the same static or gross head, $H_s$, as a pump and as a turbine, both over a wide range of speed. Fig. 9 shows similar curves for a single stage, more efficient pump of the Francis type. It will be evident from these curves that the higher the efficiency for which the hydraulic machine is primarily designed, the closer together will be the speeds of best pump and best turbine efficiency under the same static head.

As practically all losses in a hydraulic machine are proportionate to the square of water velocity or directly proportional to the head, I can express, neglecting the effect of leakage, the work of the unit quantity of water in a turbine operating under the static head $H_s$ and at an efficiency $e_t$ as being proportional to $e_t$ times $H_s$. This value represents the useful net head $H_t$ of the turbine, the difference between $H_s$ and $H_t$ being the head loss in the turbine. The same machine, when operated as a pump at an efficiency $e_p$, must produce in its runner an effective pumping head $H_p$ equal to the static head $H_s$ plus losses $$\left(H_p = \frac{H_s}{e_p}\right).$$

The flow of water through the stationary and rotating passages of hydraulic machines, operating either as pump or as turbine, is governed by the same hydraulic laws provided that these passages are so designed that there are only gradual changes in cross-section of passages favoring continuity of stream lines.

Such theoretically perfect conformity of velocity and pressure relations can rarely be reached even if the effect of friction and leakage could be neglected, but its nearest approach will occur approximately at that speed at which the hydraulic machine shows its best efficiency. I can express the approximate relation between the speeds of best pumping efficiency ($N_p$ at efficiency $e_p$) and of best turbine efficiency ($N_t$ at efficiency $e_p$) by the equation $$N_p = \frac{N_t}{\sqrt{e_t e_p}}$$

developed as follows. Since $N_p$ will be proportionate to square root of $H_p$ and $N_t$ proportionate to square root of $H_t$, I can write $$N_p : N_t = \sqrt{H_p} : \sqrt{H_t}$$

or $$\sqrt{\frac{H_s}{e_p}} : \sqrt{H_s e_t}$$

I can write then:

$$N_p = \frac{N_t}{\sqrt{e_p e_t}},$$

independent of static head $H_s$.

For conditions of perfect reversibility of flow, turbine efficiency and pump efficiency are identical and the best speeds for the two operations will be directly proportional to efficiency. For example a pump performing at 90% efficiency against a static head of 100 feet at 100 rev. per min., may be expected to operate as turbine under the same head at the efficiency of 90% when its speed is reduced to 90 rev. per min. Such variations in speed cannot be readily arranged for without appreciable increase in investment cost for variable ratio gearing or special electrical equipment, involving also a loss in efficiency. Except for special applications referred to later, we must endeavor to strike the best practical compromise of single speed operation for both purposes.

In the above described case of a pump having 90% efficiency at 100 rev. per min., we may select any speed between 90 rev. per min. and 100 rev. per min. for this compromise speed, provided that the hydraulic motor will assuredly pump even at 90 rev. per min.

There will be an intermediate speed at which the hydraulic motor functions with equal efficiency either as pump or as turbine, this speed of equal efficiency being used as 100% of the speed scale on Figs. 8 and 9, the efficiency itself being entered as point $e_{tp}$.

The centrifugal pump of the Francis type for which the characteristic curves of Fig. 9 are drawn, has the same best efficiency of approximately 77% for both operations, best pump speed ($e_p$) being 12% above the best turbine speed ($e_t$) 17% below the speed of equal efficiency ($e_{tp}$) of approximately 69%. At best pump speed, turbine efficiency drops to about 58% of $e_t$, reduction of capacity being of approximately the same order. At speed of equal efficiency, $e_{tp}$ appears approximately 10% lower than at best points, capacity of pumping and generation being reduced by a similar percentage. At best turbine speed however, this type of hydraulic machine, which had only a spiral casing but no guide vanes, will not be able to pump at all, regardless of efficiency, because the speed of impending delivery lies approximately half way between $e_t$ and $e_{tp}$.

The efficiency and power curves of Fig. 9 would show different characteristics if the casing of this pump were equipped with movable guide vanes of the type customary with reaction turbines. The curve of turbine efficiency would be less drooping for speeds above $e_t$, and the curve for pump efficiency for speeds lower than $e_p$ would not drop off as abruptly. The two curves would follow approximately the dotted lines shown in Fig. 9, with the result that at a speed only slightly higher than best turbine efficiency $e_t$, the same rotor could function as a turbine at greater capacity and only slightly reduced efficiency $e'_t$ and could operate as a pump at an efficiency of approximately 60%.

The above can be better illustrated by an analysis of the changes in the velocity diagrams at entrance and exit caused by the presence of adjustable guide vanes. The fundamental equations that must be satisfied are homologous for turbine and pump, the coefficient of efficiency appearing on the right side of the equation as multiplier of the static head ($H_s$) and acceleration due to gravity ($g$) in the turbine formula and as a divisor in the pump formula, viz:

For turbine
$$u_1 c_{u1} - u_2 c_{u2} = g \cdot H_s \cdot e_t.$$

For pump
$$u_2 c_{u2} - u_1 c_{u1} = \frac{g \cdot H_s}{e_p}.$$

The customary symbols represent:

|  | Fig. 9a at entrance | Fig. 9b at exit |
|---|---|---|
| Peripheral speed | $u_1$(AB) | $u_2$(EF) |
| Absolute velocity | $c_1$(BC) | $c_2$(EG) |
| Relative velocity | $w_1$(AC) | $w_2$(FG) |
| Component of absolute velocity in direction of peripheral speed | $c_{u1}$(BD) | $c_{u2}$ |
| Component of absolute velocity at right angle to peripheral speed | $c_{m1}$(CD) | $c_{m2}$ |

For peripheral speed $u_1$ of best turbine efficiency $e_t$, the exit velocity $c_2$ will have no horizontal or whirl component $c_{u2}$ and the general equation $u_1 c_{u1} - u_2 c_{u2} = g \cdot e_t \cdot H_s$ will become $u_1 c_{u1} = g \cdot e_t \cdot H_s$. If we increase the speed on the hydraulic machine without adjustable guide vanes from AB to AB', the velocity diagram at entrance will have point C shifted approximately to C' and on the velocity diagram at exit, point G will shift to G' without appreciable increase in $c_{m1}$, causing a shock loss CC' at entrance and a whirl component GG' at exit, both having a tendency to lower the efficiency from $e_t$ to $e_t'$, the mutual relations of the various velocities being such that again the general turbine equation will be satisfied by the changed values, viz:

$$AB' \times B'D' - EF' \times EJ = g \cdot e_t' \cdot H_s.$$

If, however, the hydraulic machine is equipped with movable guide vanes, an increase in speed from AB to AB' will result in a shifting in the entrance diagram of point C to C'', lying almost in line with AC, and a shifting in the exit diagram of point G to G'', which changes will not involve an appreciable shock loss at entrance nor whirl component at exit and will therefore not cause as large a drop in efficiency from $e_t$ to $e_t''$ as formerly from $e_{tc}$ to $e_t'$, the lowering of the efficiency being largely due to the increased friction caused by larger discharge C''D''. Again the general turbine equation must be satisfied by the changed valves of velocities and efficiency, viz: $AB' \times B'D'' = g \cdot e_t'' \cdot H_s$.

The above velocity diagrams deal with turbine operation only and show that adjustable guide vanes have a tendency to increase efficiency and capacity beyond those observed without guide vanes over the speed range between $e_t$ and $e_p$. Similarly, it can be shown that adjustable guide vanes would improve pump operation in the range of speed just below $e_p$, as indicated by the dotted line of Fig. 9.

The suitability for dual use of a hydraulic rotary machine of the characteristics as depicted in Fig. 9, could be still further enhanced if it were equipped not only with adjustable guide vanes but also with adjustable rotor blades. The turbine efficiency curve between $e_t$ and $e_p$ would be flattened out still more than shown by the dotted curve in Fig. 9 and the points on the pump efficiency curve to the left of $e_p$ would appear at lower speeds than shown by the dotted curve.

When operating Francis type turbines as pumps we cannot expect the same degree of reversibility of flow and head relations as when operating pumps as turbines, unless special precautions are taken in the design of these turbines to make them adaptable for dual use. It is a well known fact that it is easier to convert pressure into velocity without shock, which is the chief function of a turbine, than to convert velocity into pressure with a minimum of shock, as must be accomplished in a properly designed pump. Considerably more attention must therefore be given to the rate of diffusion and the elimination of shock losses when designing a pump. Fig. 10 shows in curve form the efficiency and capacity in relation to speed as obtained from model tests on a modern high specific speed Francis runner operating as turbine and as pump. The relationship of speed at best pump efficiency to speed at best turbine efficiency remains the same as developed for the hydraulic rotary machines, originally designed as pumps:

$$N_p = \frac{N_t}{\sqrt{e_t e_p}}.$$

Fig. 10 gives values obtained from several hundred pump and turbine tests on a runner model having maximum turbine efficiency of 78%. This model was an exact small scale reproduction of a 20,000 H. P. turbine on which it was not practical to carry through field tests over the same wide range of speeds and power. The full size turbine, however, had an efficiency slightly in excess of 92%.

The outstanding characteristics of the pump efficiency curve are that even at best speed the efficiency is appreciably lower than best turbine efficiency and that there is a lack of continuity at a speed just below that of best efficiency. These peculiarities can be better illustrated by following up the behavior of the pumping turbine at certain definite positions of the movable guide vanes rather than by a discussion of the efficiency curve of Fig. 10 which is an envelope curve over a large number of tests at different gate openings.

Fig. 10a shows the relation between speed and discharge with guide vanes locked in three positions, 10%, 30% and 70%. The point of discontinuity of flow is passed for the higher gate openings at lower speeds than for the lower gate openings. For the lowest gate opening of 10% this point of discontinuity would occur at a higher speed than shown on the scale.

A study of the physical dimensions of the Francis runner brought out the fact that the area measured at right angles to the stream flow through the runner vanes increased very rapidly from the inflow end to the discharge end (when operating as a pump), the discharge area being of the order of 150 percent of the inflow area. This increase of area will result in very rapid diffusion of the water flowing through the runner, and it is a well known fact that when water is diffused too rapidly the stream lines will be broken up and serious eddying with its accompanying losses and danger of cavitation will result. The discontinuity of the pump efficiency curves can be directly attributed to this phenomenon, the discontinuity occurring at the speed where the stream line flow is broken up.

It will be noted from Fig. 10a that the speed of impending delivery varies with the position of the guide vanes, the lowest speed occurring at minimum gate opening. Over the whole range of possible gate openings the speed of impending delivery varies quite appreciably, the total range under the conditions for which the test curves of Fig. 10a were obtained being approximately 30% of the minimum speed of impending delivery. Test results of Fig. 10a refer to a model set-up with complete spiral casing and with a short elbow type draft tube. Similar tests were also made with other types of draft tubes (a long conical tube and a spial type draft tube) and without spiral casing on the intake side. Relation of speed of impending delivery to gate opening for the three types of draft tubes (but all with spiral casing on the intake side), is shown in Fig. 10b.

The spiral type tube, because of the high tangential velocity component present at inflow, requires a higher speed to start pumping, and the long conical tube, probably due to larger mass of water to be started and greater friction losses, requires a still higher speed. The speeds of best pumping efficiencies also vary for the different kinds of draft tubes, the lowest speed, though not the best efficiency, occurring with the short elbow tube. For single speed operation of dual use hydraulic machines, lowest practical speed of impending delivery is essential. For those dual use machines where a higher speed can be employed for pumping than for turbine operation, this condition may be waived in favor of higher efficiency when pumping at the higher speed.

On Fig. 10a, for the discharge curve at 30% gate opening, a dotted line has been drawn in near speed of impending delivery. This is indicative of a typical condition found in practically all tests at various gate openings. It requires a greater speed to begin pumping than to continue pumping once the flow is started, even though the water passages are filled with water at all times. The full line curve of quantity versus speed for 30% gate opening in Fig. 10a was obtained for increasing speeds, whereas the dotted line was obtained for decreasing speeds, resembling the well known magnetic hysteresis loop of iron. If the speed of the pump were gradually increased, starting just below the speed of impending delivery, the flow would increase very slowly at first and then more rapidly, to a point about 10% above the speed of impending delivery. By reversing the procedure and gradually decreasing the speed, the flow would remain nearly constant down to the speed of impending delivery, at which speed the flow would suddenly drop to zero.

As mentioned above, this characteristic condition was observed for practically all guide vane openings and for different types of draft tubes. This action may be explained by the fact that for water passages that have a substantial difference of radii in a cross-section at right angles to the stream line, outward flow, i. e., pumping, will start first on that portion of the cross-section where the radius is greatest. In those portions of the cross-section where the radius is smaller, there will not be an outward flow but probably an inward flow sustained by the pumping action of the larger radius sections.

This will have a tendency to maintain a circulating flow within the water passages of the runner, the area of which circulation will be gradually reduced as the pumping pressure of the outer radius sections will increase. Eventually the circulating area of the inner section will be entirely eliminated at the higher speeds although the pumping work done, or the discharge per square inch of cross-sectional area will always have a tendency to be greater on the outside than on the inside. If we lower the speed from a value at which pumping action had been observed over the whole cross-sectional area, the transition of the outward or pumping flow to a partly pumping and partly circulating flow will occur at a lower speed than transition of partly pumping and partly circulating flow to all outward or pumping flow, when gradually increasing speed. This phenomenon is of some importance when developing dual use machines from those types of turbine runners where there is a relatively large difference in radius in the cross-sectional area at right angles to the stream lines. One should endeavor then to design the inner area for slightly larger diffusion so as to produce there greater pressure, which will have a tendency to counteract the circulation from the outer areas, without however exceeding the permissible rate of diffusion for the velocities prevailing in the inner radii sections.

The speed of impending delivery can be lowered, the circulation of water in the runner passages can be further reduced, and more uniform flow over the whole cross-section of the water passage can be established at a lower speed, if not only the stationary guide vanes but also the blades of the rotor are made adjustable for different angular positions, so that the angles of the blades to the periphery at the points of entrance and exit as well as the cross-sectional areas of the water passages can be reduced. The effect of smaller guide vane angles and of smaller blade angles on the lowering of the speed of impending delivery, as observed during the experiments, can also be shown by an analysis of the velocity diagrams, as indicated in Figs. 11 and 11a.

We will assume that at a speed only slightly above that of impending delivery, a very small amount of water is discharged, the radial component of which is $dc_m$. We may regard this small quantity of water, corresponding to the radial discharge velocity $dc_m$ to be just sufficient to be measurable.

Fig. 11 gives the velocity diagrams at the inflow and outflow edges of a turbine, operating as a pump. When this small quantity of water $dc_m$ is being pumped, two positions of the guide vanes, $\alpha_1$ and $\alpha_2$ are assumed, the smaller angle $\alpha_1$ representing the guide vanes in almost closed position. For shockless exit, a still lower angle of the guide vanes, $\alpha$, would be required in order to complete at a peripheral speed $u_2$ the velocity diagram ABC.

It may be seen from the general pump equation $$u_2 c_{u2} - u_1 c_{u1} = \frac{g.H}{e},$$

that for an assumed discharge $dc_m$, a higher hydraulic efficiency will permit lower peripheral speeds $u_2$ and $u_1$. The exit velocity triangle of Fig. 11 shows the shock loss for the angular position of the guide vanes corresponding to $\alpha_1$ to be proportional to the square of CC′, and for the angular position $\alpha_2$ a loss in efficiency proportional to the square of CC″. It is therefore evident that the exit shock losses increase with increased vane angle, the greater vane angle therefore requiring a greater value of $u_2$ to pump $dc_m$ which, as mentioned above, is the first increment of flow at a speed nearly equal to that for impending delivery. An inherent effect of this increased $u_2$ required for larger vane angles is its effect on the whirl component at inflow, shown on the inflow diagrams of Fig. 11. An increase in the peripheral speed $u_1$ will increase $c_{u1}$ (FH), the whirl component of the entrance velocity, thereby requiring a still greater increase in $u_2$. We may therefore expect that, due to the direct effect of shock loss and the indirect effect of increased whirl component at higher speed, the speed of impending delivery will show a relatively large increase as the angles of the stationary guide vanes to the periphery become greater.

In the velocity diagrams of Fig. 11a it will be shown that a similar relation exists between speed of impending delivery and angular position of adjustable rotor blades, assuming that the stationary guide vanes remain in the same position. In the exit diagram $\beta_1$ represents the larger angle and $\beta_2$ the smaller angle of the rotor blades to the tangent, $\alpha_1$ being the smallest practical angle of the guide vanes at speed of impending delivery. Similarly, I have shown at the point of inflow the velocity diagram EFG for the more open position of rotor blades corresponding to angle $\Delta_1$, and velocity diagram E'FG corresponding to a smaller angle of rotor blades $\Delta_2$. The whirl component FH at entrance for angle $\Delta_1$ is reduced to a smaller value FH′ for angle $\Delta_2$, which has the effect of reducing the subtrahend $u_1 c u_1$ in the general turbine equation. We have again the same two-fold effect, i. e., the reduction of shock losses for the smaller angles of rotor blades at exit will improve the efficiency and thereby lower the factor $$\frac{H}{e}$$

on the right side of the general pump equation, permitting lower peripheral speed; the smaller angle $\Delta_2$ at entrance will, for same speed, decrease the whirl component, but since the improved efficiency will permit lower speed we will have a further lowering of the whirl component.

It is also apparent from Fig. 10a that for the same speed better diffusion occurs at the higher water velocities. A runner designed for dual use, where a certain amount of diffusion is necessary for best turbine operation, should therefore be laid out for high relative velocities, which are best obtained by higher peripheral speed and small blade angle.

The cross-sectional relation alone of inflow and outflow area over a given length, or the rate of diffusion per foot length of flow line, is not a complete measure for expressing the diffusion characteristics of a runner. It is evident that a runner of narrow width with radial inflow and outflow, with a gradual curvature of center line of stream flow in one plane, at right angles to the axis of rotation, will permit a greater rate of diffusion at the same velocity than a runner of greater width, or more abrupt curvature of center line of stream flow and with a turning of this stream line in more than one plane.

The runner model, from which the test curves in Figs. 10, 10a and 10b were obtained, had all the last mentioned unfavorable characteristics, which explains the relatively low efficiencies and unduly large spread between speed of best turbine and best pump efficiency. Yet some modifications, practically every type of turbine can be adapted for dual use, by designing runner passages, vane angles, guide vanes, and selecting peripheral speed, draft tubes, etc., with some consideration for suitability for pumping rather than exclusively for use as turbine.

As to peripheral speed, a study of test results in conjunction with the actual dimensions of the runners under test, indicated that pumping over the whole cross-sectional area of the water passages as well as improved diffusion is obtained, if peripheral speed at the smallest diameter exit edge is slightly greater than $$\sqrt{2g.H},$$

or a minimum of 8.05 times square root of highest pumping head. It was also observed, though somewhat contrary to what might be expected, that the permissible rate of diffusion is greater at higher velocity and that to obtain best conditions over a given length of flow line, the diffusion head per unit length of flow line may be decreased approximately in proportion to the square root of the water velocities.

In the case of axial and diagonal flow turbines and also of those radial flow turbines, where there is an appreciable difference in diameter along the inflow edge of the rotor blades (when operating as turbines), the suitability for dual use is greatly improved if the tips of the guide vanes are brought as closely as practicable to the edge of the rotor blades and if the angles of the guide vanes are made smaller at the points opposite the smaller diameters of the rotor blades than at the points opposite the larger diameters. The guide vanes themselves may be placed either diagonally or radially.

Figure 17:
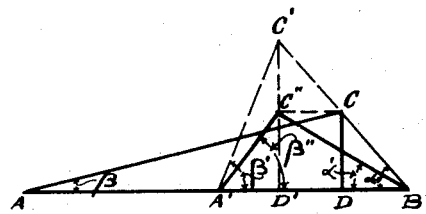
Fig. 17 is a velocity diagram showing determination of varying angle guide vanes.

The variation in the angles of the guide vane tips should be approximately in conformity with the angles $\alpha$ and $\alpha'$ of the velocity diagram shown in Fig. 17, in order to have a minimum of shock losses and whirl component and approximately the same head produced along the width of the rotor blade.

In Fig. 17, AB is the peripheral velocity of the maximum rotor blade diameter and A'B the peripheral velocity of the minimum diameter. For the guide vane angle $\alpha$ at the point of maximum diameter and the angle $\beta$ at the corresponding point of the runner blade, the velocity diagram ABC will close without shock loss and at a rate of radial outflow CD if under conditions of shock free entrance the pump equation $$\frac{H.g.}{e_p} = AB \times BD$$

is satisfied. If we also aim at shock free exit and shock free and whirl free entrance at the minimum diameter flow line, and without any change in the guide vane angle $a$, the partly dotted velocity diagram A'BC' will prevail in which again the general pump equation must be satisfied by $$\frac{H.g.}{e_p} = A'B \times BD'.$$

This would require a relatively steep angle $\beta'$ at the runner blade and a relatively large rate of radial inflow C'D' which cannot be properly taken care of due to the restricted condition of flow passages at the smaller diameters. This latter condition will have a tendency to produce shock loss at exit and a throttling down of the rate of outflow to approximately the same value over the whole width of the blade. A reduction in the angle $\alpha$ of the guide vanes at the point of maximum diameter, to the value $\alpha'$, shown in the diagram of Fig. 17, at the point of minimum diameter, for which angle the full line velocity diagram A'BC is assumed to satisfy the pump equation $$\frac{H.g.}{e_p} = A'B \times BD',$$

will permit shockless exit, an angle $\beta''$ at the runner blade less steep than $\beta'$, and approximately the same rate, C''D', of radial outflow as at the point of maximum diameter.

As this invention is primarily applicable to water power plants, located serially on rivers with variable stream flow, the hours of use of the hydraulic motor as turbine will greatly preponderate over the hours of use as pump. Any reduction in efficiency and capacity of the hydraulic motor when used as a turbine below that obtainable at the speed of best turbine efficiency will entail a much greater economic loss than the same amount of reduction in efficiency and capacity when used as a pump below that obtainable at the speed of best pump efficiency.

In some special applications, however, where the average natural inflow is negligible and the capacity of the storage reservoir is very large, dual use hydraulic units operating at or near the speed of best pump efficiency will prove advantageous if operated in combination with single purpose hydraulic units, i. e., separate pump and separate turbine. As the pumping involves a steady load operation during the whole pumping period, whereas turbine operation, due to the shape of the load curve as indicated in Fig. 1, may be divided into a base load generation by the single purpose units at high efficiency and into peak generation of short duration by the dual purpose units at lower efficiency, the saving in investment costs for separate single purpose units may greatly exceed the energy losses due to lowered efficiency of generation.

Except for the above described special conditions and certain others referred to later the most frequent application of this invention will be concerned with those cases where the operating speed will be selected at or near the point of best turbine performance and in consequence thereof a reasonable reduction in pumping efficiency will be accepted. My experiments and the designs developed therefrom were directed towards first determining the relationship of pump and turbine efficiencies for different types of now available hydraulic rotary machines because no research work covering that field had been done in so far as I was able to find in literature or through inquiries from the leading experts in this country and abroad and, second, towards establishing the fundamental theory and suitable designs of hydraulic dual use machines in combination with suitable electrical machines to make this invention practically applicable over a wide range of conditions.

Aside from these experimental and theoretical studies of present types and proposed new types of hydraulic machines, I also determined the most effective method of operating dual use machines in actual service, based on observations of laboratory and field tests conducted for that purpose, including actual pumping with large turbines up to 20,000 H. P.

As brought out in the early part of this disclosure, variations in head due to the combined effect of drawdown from the upper pond and accumulation of excess discharge in the lower pond will depend largely on the individual characteristics of the water power developments. Where pondage is relatively large in comparison to minimum natural inflow, these variations in head, expressed in percentage of normal head, will not be as great as in certain other cases where pondage is relatively small. Some types of dual use hydraulic machines, among those described below, will be better suited for large variations of head than some of the other types.

Other factors controlling the selection of dual use machine best suited to the conditions, refer to the relative preponderance of generating hours during high flow over pumping hours during low flow; to the unit value of high flow peak energy and low flow off-peak energy; to the amount of normal head which, when high, favors the lower specific speed type of Francis runner inherently better suited for efficient dual use but, when low, favors the diagonal or axial flow turbine; to the question of head variation during extreme high and low flow stages of the river, which, when large, favors the employment of turbines of the more expensive adjustable blade type for reasons other than consideration of dual use.

In most cases the selection of either fixed or adjustable rotor blade type of hydraulic machines, operating at the same speed as turbine and pump, will satisfactorily meet the requirements of best economic utilization of water power developments contemplated by this invention. In some special cases, however, where power is supplied at two frequencies or where the difference between maximum and minimum head is relatively large, operation of the dual use unit at different speeds will be practical and economical.

For example, if some of the generators supply single phase traction load at low power factor and at a frequency of, say, 25 cycles, the dual use machine can be connected to a generator capable of operating as motor at a frequency of 60 cycles and at a speed 20% greater than generator speed. The capacity of the electrical machine as a motor will then be approximately 70% to 100% greater than its capacity as a generator. In other cases, where the variation of head is large, the electrical machine can be designed for motor operation at double speed with an increase in capacity of approximately 100% over its capacity as a generator at half speed.

It is not possible to give in this disclosure a complete list of all combinations of different type dual use hydraulic machines in combination with single speed or two speed electrical machines, specifying the best suitability of every combination for certain hydraulic and electrical conditions. However, I have made an investigation of the characteristic behavior of the different types of turbines, suitably designed for dual use, within the range of their practical adaptability for single speed or two speed operation and am giving in tabulated form the approximate results to be expected as to efficiency and capacity under those conditions. The tabulation below will make it possible for anyone familiar with the art of hydro-electric engineering and power system planning, who follows the disclosures of this invention, to select the general type of equipment as a preliminary step for the final design of hydro-electric developments to which this invention is applicable.

*I. Turbines with fixed blades*

|  | (a) Francis | (b) Diagonal flow | (c) Axial flow |
|---|---|---|---|
| Pump performance: Speed in percent of turbine speed | 100  120 | 100  120 | 100  120 |
| Power in per cent of turbine power | 115  175 | 115  175 | 115  175 |
| Approx. efficiency | 72.5%  80.25% | 76.5%  80.75% | 73%  80.75% |

II. Turbines with adjustable blades

|  | (a) Francis | | | (b) Diagonal flow | | | (c) Axial flow | | |
|---|---|---|---|---|---|---|---|---|---|
| Pump performance: Speed in percent of turbine speed | 100 | 120 | 200 | 100 | 120 | 200 | 100 | 120 | 200 |
| Power in per cent of turbine power | 115 | 175 | 200 | 115 | 175 | 200 | 105 | 175 | 200 |
| Approx. efficiency | 83% | 85% | 60% | 84% | 85% | 60% | 84% | 85% | 60% |

The above data on expected pump performance are all based on a best turbine efficiency of 92%, power and speed at best turbine efficiency being taken as 100%. Allowance has been made for reversed slope in tailrace, intake and setting losses, by assuming a net pumping head 10% greater than net turbine head. As brought out previously, turbine capacity may be appreciably increased at slight sacrifice of efficiency, if a normal operating speed greater than 100% (speed of best turbine efficiency) is selected. This higher speed would materially increase pumping efficiency for all cases of single speed operation. Conversely, however, in the case of double speed operation, a slight lowering of turbine speed will materially increase pumping efficiency.

Before taking up the detailed description of certain improvements to hydraulic rotary machines that are essential for making them suitable for dual operation, I wish to explain certain novel features of those electrical machines that will be used in conjunction with dual use hydraulic machines, when operating at different frequencies or speeds.

The arrangement of devices described below offers a means of quickly and conveniently changing the relation between speed and frequency of an alternating current machine, while not appreciably affecting the voltage delivered in the case of a generator, or of the supply voltage required in the case of a motor.

The explanatory diagrams given in Figs. 12 and 12a, 13 and 13a, refer to a simple type of machine but the claims, as a matter of principle and application, apply to any alternating current machine, regardless of the arrangement of stator and rotor, number of poles, armature windings, voltage, current and number of phases. The reversing switches, similarly, cover any collection of switches, contactors and circuit breakers which will porform the same essential operation as the simple knife switch shown on the diagrams.

Figure 12:
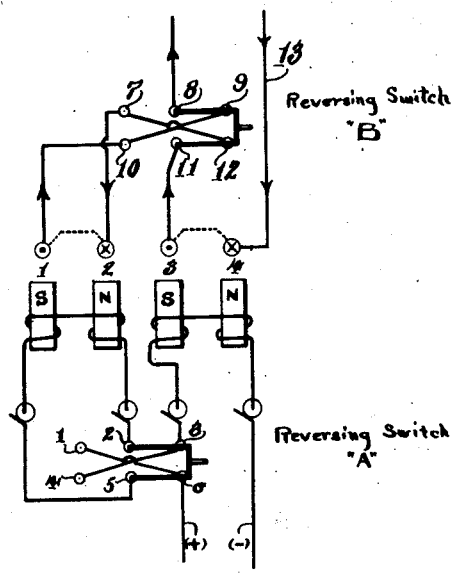
Fig. 12 shows the wiring diagram of an electrical machine, suitable for operation at two frequencies, with reversing switches of field and armature windings in position for operation at the higher frequency.
Figure 12A:
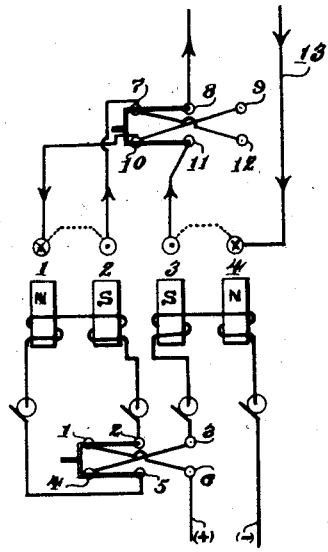
Fig. 12a shows the wiring diagram of the same electrical machine as in Fig. 12, with reversing switches of field and armature windings in position for operation at the lower frequency.
Figure 13:
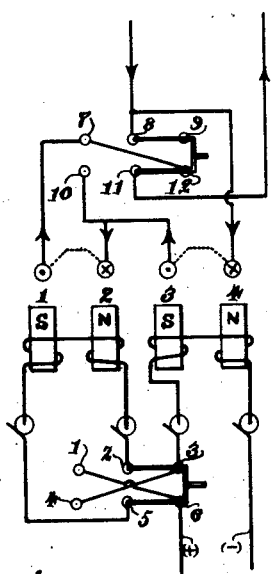
Fig. 13 shows the wiring diagram of an electrical machine suitable for operation at two speeds, with reversing switches of field and armature windings in position for operation at the lower speed.
Figure 13A:
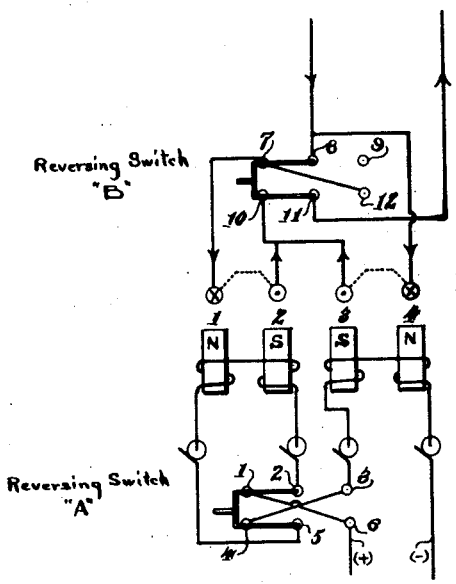
Fig. 13a shows the wiring diagram of the same electrical machine as in Fig. 13, with reversing switches of field and armature windings in position for operation at the higher speed.

Figures 12 and 12a, 13 and 13a, represent the same electrical machine but with different external electrical connections. Figures 12 and 12a show external connections which permit changing quickly and conveniently the frequency from $$F \text{ to } \frac{F}{2}$$

or to some other frequency. Figures 13 and 13a show external connections which permit equal flexibility in changing the speed of a machine from N to 2N. It would be equally feasible without greatly complicating the external connections, to perform either or both changes to the same machine in an equally convenient manner.

The alternating current machine shown has been taken, for the sake of simplicity, as a single phase generator, having a stator armature with one coil per slot per pole, a rotating field with four poles, and a set of four slip rings for collecting the field winding current. The armature windings are in two separate parts, one in slots 1—2 and the other in slots 3—4. The field windings are also in two separate parts; one for field poles 1—2 and the other for field poles 3—4.

The circles representing the armature conductors are marked either ⊙ or ⊗, the symbol ⊙ signifying direction of induced voltage or current flowing toward the observer, and the symbol ⊗ signifying direction of induced voltage flowing away from the observer. Direction of rotation is assumed as such that a conductor under a north pole will be marked ⊗. Each separate field winding is so arranged that the polarity of its own field poles is alternately north N and south S in sequence around the rotor.

Before changing from frequency F to a lower frequency, say, $$\frac{F}{2},$$

the voltage and speed remaining constant, the reversing switch A in Fig. 12 is thrown to position on clips #3 and #6, thus putting all field windings in series. Polarity (north N and south S) will then fall as shown with alternate N and S poles in sequence around the rotor. Leads from the two separate armature windings are brought out as shown, one winding to terminals 7 and 10, the other winding to terminals 13 and 11 of the reversing switch B. The reversing switch B is thrown to position on clips #9 and #12, thus putting the two armature windings in series. This machine is now operating at frequency=F, rev. per min.=N, voltage=E.

To obtain operation at the frequency $$\frac{F}{2},$$

rev. per min. N and approximately same voltage E, switch A in Fig. 12a is thrown to position on clips #1 and #4, thus reversing the current through field windings of poles 1 and 2. Polarity will then fall as shown with two N and two S poles in alternate sequence around the rotor. The net result, from a magnetic standpoint, has been to change from a 4 pole to a 2 pole machine. The direction of current in the armature conductors 1 and 2 will change. Reversing switch B is now thrown to position in clips #7 and #10, which puts the two armature windings in series with their voltages added together.

If instead of $$\text{Frequency} = \frac{F}{2}$$

we wish to operate at another frequency, for example:

$$\frac{25}{60}F,$$

the rev. per min. will be $$\frac{25}{30}F$$

and voltage approximately $$\frac{25}{30}E.$$

In the case of a three phase machine we can, by insertion of a reversing switch in the main leads of two phases, control direction of rotation of the machine.

We thus have an alternating current machine with two separate sets of field windings and two separate sets of armature windings, which when run with field windings connected in series for alternate N and S poles and armature windings connected in series, will give a frequency of F and voltage of E when rotating at N rev. per min. If one set of field windings is reversed and the corresponding set of armature windings is reversed, field and armature windings being again properly connected in series, then this alternating current machine will give a frequency of $$\frac{F}{2}$$

and voltage of E when rotating at N rev. per min. Field current and the allowable current capacity of the machine are the same in both cases.

In Figs. 13 and 13a I have shown schematic diagram of an alternating current machine, in which the speed N may be changed to speed 2N the frequency and voltage remaining constant.

The field reversing switch A in Fig. 13 is thrown to position on clips #3 and #6 thus putting all field windings in series. Polarities north N and south S will then fall as shown with alternate N and S poles in sequence around the rotor. Leads from the two separate armature windings are brought out as shown; one winding to terminals 7 and 10, the other winding to terminals 8 and 10. Terminal 10 is a common connection between the two sets of windings. The reversing switch B is thrown in position to clips #9 and #12, thus putting the two windings in series. The machine is now operating at frequency=F, rev. per min.=N, and voltage=E.

To obtain operation at rev. per min.=2N, reversing switch A in Fig. 13a is thrown to position on clips #1 and #4, thus putting the two field windings in series. The polarities will then fall as shown, two north N and two south S in alternate sequence around the rotor. Leads from the armature windings are connected to reversing switch B, which is thrown to position on clips #7 and #10, thus putting the two windings in parallel with their currents added together.

We thus have an alternating current machine with two separate field windings and two separate armature windings which, when the fields are connected for alternate N and S sequence and the armature windings connected in series, will give a frequency of F and a voltage E when running at N rev. per min. If by suitable means one set of field windings is reversed so that there are two N and two S poles in alternate sequence, and the armature windings are connected in parallel, then the machine will give a frequency of F and a voltage of E when rotating at 2N rev. per min. The field current is the same in both cases and the allowable current capacity of the machine is twice at 2N rev. per min. what it is at N rev. per min.

The above novel types of electrical machines suitable as dual use machines in combination with dual use hydraulic motors for the same speeds or for different speeds, either at the same frequency or at two frequencies, broaden the range of practical applicability of this invention, especially in those cases where there is a relatively large variation of head. These dual use electrical machines may be combined with any one of the several types of turbines suitably designed for dual use, as described below.

In all these machines the peripheral speed of the smallest diameter exit edge of the runner blades when operating as a pump, must be slightly greater than 8.05 times the square root of the highest pumping head. The blade angles to the tangent at any point of exit should not be greater than approximately 45°, and at the largest diameter not more than 35°. This arrangement of angles will greatly reduce the percent diffusion as compared with the customary larger angles and permits operation as turbine at a speed higher than that of best efficiency with considerable gain in capacity and at only small reduction of efficiency. A gradual change in the rate of diffusion should be maintained but as the rate of diffusion per foot of length can be greater at higher velocities than at lower velocities, without danger of breaking up stream lines, it is permissible and desirable to so proportion the water passages between vanes that the difference between the square roots of the water velocities measured in any two cross-sections at right angles to the flow line, one foot apart, shall be approximately the same over the whole length of the channel.

As these small blade angles have the further tendency to increase relative speed in the vane passages and also require greater length of blades measured in the direction of flow, a somewhat greater amount of friction losses but a better guiding of stream line will be obtained. To counteract the effect of greater friction due to increased relative velocity and longer blades, it is advisable to decrease the number of blades as compared with the number that is customary in the same type of turbine designed only for single use, and to omit the outside rim of the rotor wherever practicable.

In Figs. 14, 14a, 14b and 14c, I show the details of a radial flow turbine with adjustable blades and in Figs. 15 and 15a the arrangement of adjusting mechanism at the end of the hollow turbine shaft.

Each rotor blade 1 is integral with a pivot 2 fitting into the inside rim of the rotor 3 and retained therein in such a manner that it may rotate around the axis of the pivot but may not move axially. This is accomplished by a split collar ring 4, fastened by bolts 5 to the rim of the rotor, the inside portion of the ring fitting into a recess 6 of pivot 2. Lever arms 7 are fastened by keys 7a to the free end of pivot 2, which arms have gear shaped segments 8 that engage with spoked spur gear 9 mounted co-axially with the main shaft 10 of the rotor on the short shaft 11, supported in bearings 12 and 13, fastened to the hollow hub 14 of the rotor.

For the purpose of taking up all lost motion in the adjusting mechanism and of also preventing excessive overspeed in the event of breakage in any part of the mechanism, the pivots 2 of rotor blades 1 are slightly off center in such a manner that under all conditions of turbine or pump operation there will be a twisting moment, produced by the water pressure, tending to move the blades into closed position.

To the spur gear 9 are attached two plate links 15 connected to screw stems 16, fitting into nuts 17, held rigidly in place relatively to the rotor shaft by bearings 18, attached to the hollow hub 14 of the rotor 3. The outsides of the nuts are shaped as worm wheels 19, driven by worms 20. The worms 20 are mounted on radially located worm shafts 21, the outer ends of which are supported by inner axial bearings 22 and two-way thrust bearings 23, both rigidly connected to the hollow hub 14, the inner axial bearings being supported by brackets 24.

Bevel gears 25, mounted on the inner ends of the worm shafts, engage with bevel gear 26 attached to adjusting shaft 27, located co-axially with and in the hollow main shaft 10 of the rotor. Adjusting shaft 27 is supported by sleeve bearings 28 and 29, Fig. 14, and by thrust bearing 30.

Figure 14B:
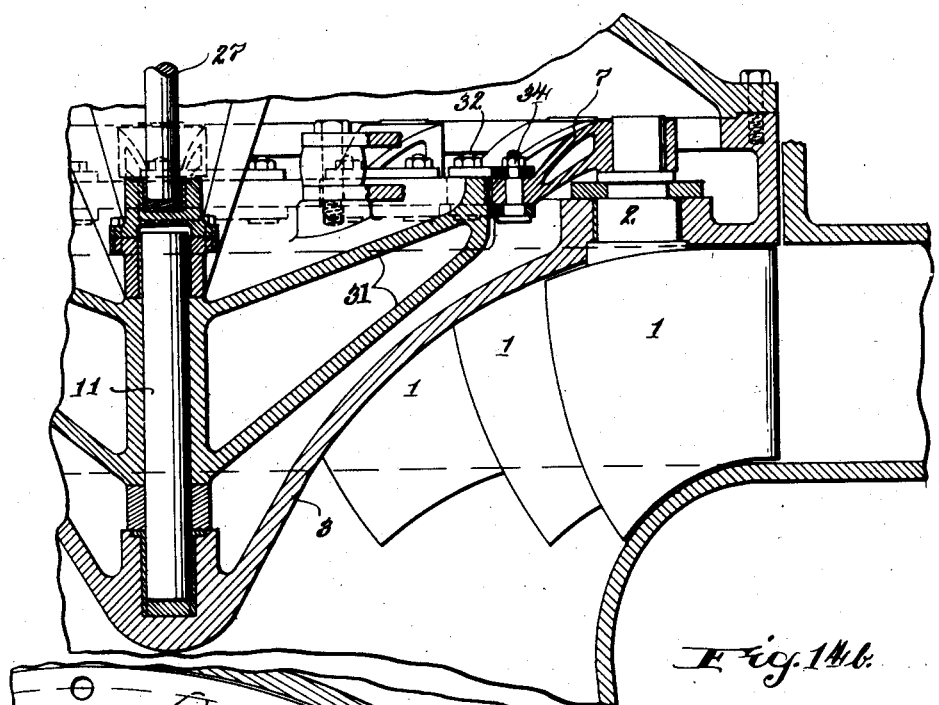
Fig. 14b is a cross-sectional elevation of a radial flow turbine with adjustable blades showing link connection blade arm and adjusting spider.
Figure 14C:
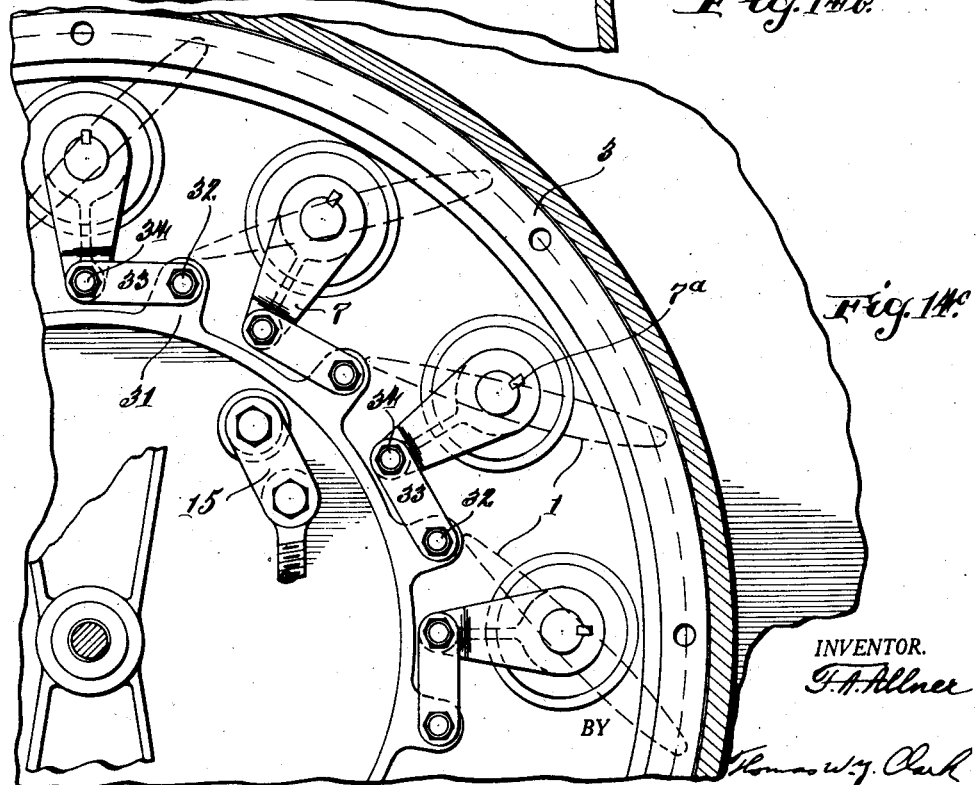
Fig. 14c is a plan view of a radial flow turbine with adjustable blades showing link connection between blade arm and adjusting spider.

Instead of the spur gear 9 engaging the gear shaped segments 8 of lever arms 7, a spider arm 31, shown on Figs. 14b and 14c, can be employed that will engage through suitable bolts 32 and links 33 with bolts 34 fastened to the lever arms of each rotor blade.

In Figs. 15 and 15a I have shown the control motor, or runner blade angularity adjuster and indicator; hollow shaft 10 carrying the runner hub 14 rotates in bearing 35 mounted by supports 36 to the top rim of the electric machine 37. Blade adjusting shaft 27 rotates freely in hollow shaft 10 on bearings 38. Keyed to, and rotating with, hollow shaft 10, is a stator 39 of a motor. Shaft 27 has keyed to and rotating with it, the rotor 40 of the motor, so that upon energizing of the motor, the hollow shaft 10 and the adjusting shaft 27 will rotate relatively the one to the other and thereby adjust the angularity of the runner blades. Brushes 41 on casing 42 contact with slip rings 43 on the upper stator hub 44. Threads 45 are on the upper end of adjusting shaft 27, and with these threads, mesh corresponding threads 46 on sleeve 47. This sleeve 47 is splined to the upper hub member 44 of stator 39 and rotates with it. Consequently, upon relative movement of shafts 10 and 27, axial movement is imparted to sleeve 47, and this movement is imparted to lever 48 through the collar ring 49 running in a collar on sleeve 47. Indicator hand 50, therefore, shows the blade angularity. Lever 48 may be connected by rod 51 to a standard governor not shown, customarily used on hydraulic prime movers.

In Figs. 16, 16a, 16b and 16c, I have shown the arrangement of blades and hollow hub for a diagonal flow hydraulic machine. Each rotor blade 1 is integral with a pivot 2 fitting into the inside rim of the rotor 3 and retained therein in such a manner that it may rotate around the axis of the pivot but may not move axially. This is accomplished by a split collar ring 4, fastened by bolts 5 to the rim of the rotor, the inside portion of the ring fitting into a recess of pivot 2, the same as in Fig. 14. Lever arms 7 are fastened by keys 7a to the free end of pivot 2, which arms have a gear shaped segment 8 that engages with a bevel gear 9 mounted co-axially with the main shaft 10 of the rotor on the short shaft 11, supported in bearings 12 and 13, fastened to the hollow hub 14 of the rotor.

To this short shaft 11 are attached two lever arms 52, the ends of which are connected by links 15 to screw stems 16, fitting into nuts 17, held rigidly in place relatively to the rotor shaft by bearings 18, attached to the hollow hub 14 of the rotor. The outsides of the nuts are shaped as worm wheels 19, driven by worms 20. The worms 20 are mounted on radially located worm shafts 21, the ends of which are supported by axial bearings 22 and combined axial and two-way thrust bearings 23 both rigidly connected to the hollow hub 14.

Bevel gears 25, mounted on the inner ends of the worm shaft, engage with another bevel gear 26 attached to adjusting shaft 27, located co-axially with and in the hollow main shaft 10 of the rotor. Adjusting shaft 27 is supported by sleeve bearings 28 and 29 and by thrust bearing 30.

Figure 16B:
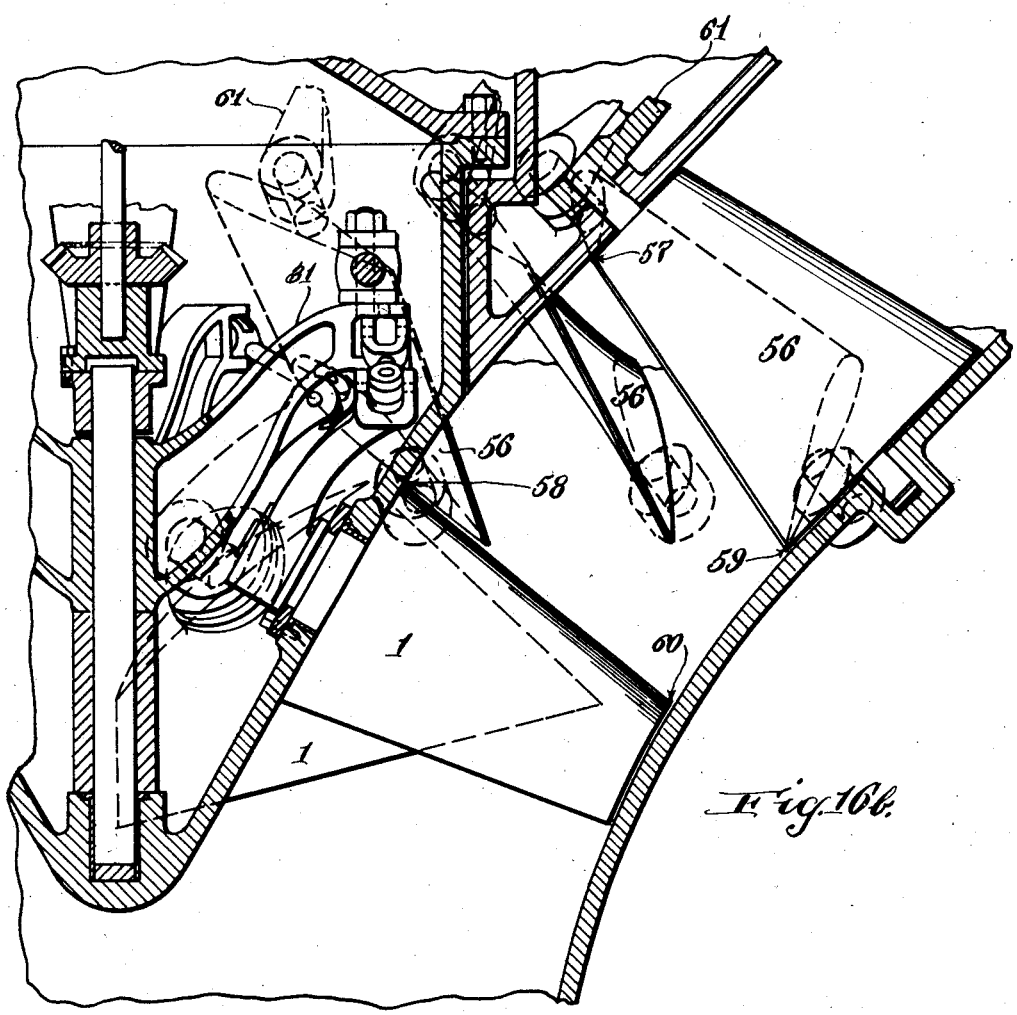
Fig. 16b is a cross sectional elevation of a diagonal flow turbine with adjustable blades showing link connection between blade arm and adjusting spider and showing also varying angle guide vanes.

Instead of bevel gear 9 engaging the gear shaped segments 8 of lever arms 7, a spider arm 31, shown in Figs. 16b and 16c, can be employed that will engage through universal joints 53 and links 54 with universal joints 55 of the lever arms 7 of each rotor blade.

The same angularity adjuster at the end of the hollow shaft, as shown in Figs. 15 and 15a, can also be employed in combination with axial or diagonal flow hydraulic motors.

In Figs. 16b and 16c I have also shown an arrangement of varying angle guide vanes 56, which have a smaller angle to the tangent at the points 57, corresponding to the smaller diameters 58 of the rotor blades 1, than at the points 59, corresponding to the larger diameters 60 of the rotor blades 1. This type of guide vanes is suitable for diagonal flow turbines with adjustable blades and with fixed blades. They can be used in diagonal position, as shown in Figs. 16b and 16c, or in radial position. The lever arms 61 of these varying angle guide vanes 56 are connected by suitable means, not shown, to the gate operating mechanism, customarily employed with turbines of this type.

It will be appreciated that the various constructions, arrangements and processes described above have been given by way of example only and that modifications may be made without departing from the scope of the invention.

What I claim as my invention and desire to secure by Letters Patent is:—

1. The method of increasing the useful low flow capacity value of two or more hydro-electric plants having an interconnected power system and provided with pondage, located serially in the same stream, in such a manner that the headwater level of each lower plant forms the tailwater level of the next upper plant, which method consists in discharging at times of low river flow water in excess of the stream flow through the upper plant or plants during the heavy load hours, retaining such excess discharge in the pond or ponds of the lower plant or plants and operating during the hours of light load demand of the interconnected power system, when the water power plants are not generating power, a portion or all of the installed generating units at the upper plants as motor driven pumps for lifting such excess discharge from the lower level or levels to the higher level or levels.

2. The method of increasing the useful low flow capacity value of three or more hydro-electric plants having an interconnected power system, which plants are located serially in the same stream and of which one or more of the intermediate plants have little or no pondage, which method consists in discharging at times of low river flow water in excess of the natural stream flow through the upper plants, retaining such excess discharge in the pond of the lowest plant and operating during the hours of light load demand of the interconnected power system, when the water power plants are not generating power, a portion or all of the installed generating units at the upper plants as motor driven pumps for lifting such excess discharge from the lower levels to the pond of the uppermost plant.

3. The method of increasing the useful capacity value of two or more water power plants in excess of the useful capacity available from minimum stream flow, the plants being located serially in the same river in such a manner that the headwater level of each upper plant forms the tailwater of the next upper plant, which method consists in so designing the dam structures of the lower plants that at times of low river flow a water level higher than normal may be maintained for the purpose of accumulating water discharged in excess of the natural inflow by the next higher plant, and providing turbine generator sets in the upper plants which are capable of operating as motor driven pumps to lift such excess discharge from the lower levels to the upper levels.

4. The combination with a river, of waterwheel generators located at at least two different levels of said river and interconnected with an electrical transmission system having at least one other source of power, the upper ones of said waterwheel generators being capable of operation also as motor driven pumps and the lower ones of said generators being so located that their headwater level will overlap the discharge level of said upper waterwheel generators, pondage being provided at the headwater levels of both said upper and lower waterwheel generators.

5. The combination with a river, of water power plants located at at least two different levels of said river and interconnected with an electrical transmission system having at least one other source of power, the upper plants having means to elevate water from the headwater level of the lower plants to the headwater level of the upper plants, pondage being provided at the headwater levels of both said upper and lower plants, the lower plants being so constructed that their headwater level will overlap the discharge level of said upper plants in such a manner that the overlap will be sufficiently great to permit retaining in the pond of the lower plants a large amount of discharge in excess of the natural inflow of the river and, in addition, to permit backflow of water with a small loss of head due to surface slope between the dam crests of the lower plants and the points of discharge from the upper plants when water is flowing upstream at a rate of flow equal approximately to the maximum discharge capacity of the upper plant.

6. The combination with a river, of power plants located at two or more different levels in said river comprising hydraulic rotary machines some of which in one upper plant are adapted to elevate water from the headwater level of the next lower plant to that of the said upper plant and connected to electrical machines which are interconnected with an electrical transmission system having at least one other source of power, the headwater level of one of the lower of said power plants overlapping the discharge level of the next upper power plant and pondage being provided in said river at the headwater levels of said plants having the overlapping headwater and discharge levels.

7. The combination with a river, of power plants located at two or more different levels in said river and comprising hydraulic rotary machines the upper of which are connected to dual use electrical machines capable of operating as generators driven by turbines or as motors driving pumps, said dual use electrical machines being interconnected with an electrical transmission system having at least one other source of power, the headwater level of one of the lower of said power plants overlapping the discharge level of the next upper power plant and pondage being provided in said river at the headwater levels of said plants having the overlapping headwater and discharge levels.

8. The combination with a river, of water power plants located at at least two different levels of said river and interconnected with an electrical transmission system having at least one other source of power, one or more consecutive upper plants having means to elevate water from the headwater level of one or more of the next lower plants to the headwater level of the next upper plants, the upper of said consecutive plants having overlapping discharge levels with the headwater levels of the next lower plants, and pondage being provided at the headwater levels of the lowest and highest of said consecutive plants.

9. In combination with a river, two ponds located at different elevations in the stream of the river, water power plants at the stream outlets of each of said ponds, said water power plants being interconnected with means having at least one other source of power to raise water from the lower of said ponds to the upper of said ponds.

10. In combination with a river, two ponds located at different elevations in the stream of the river, water power plants in the stream of the river, including one at the stream outlet of each of said ponds, the discharge water levels and the headwater levels of said plants between said ponds overlapping, said water power plants being interconnected with means having at least one other source of power to raise water from the lower of said ponds to the upper of said ponds.

11. In combination with a river, two ponds located at different elevations in the stream of the river, water power plants in the stream of the river, including one at the stream outlet of each of said ponds, the discharge water levels and the headwater levels of said plants between said ponds overlapping, dual use electrical machines in said plants located above the lower of said ponds, said machines being adapted to operate as generators driven by turbines, or as motors driving pumps to raise water from the lower of said ponds to the upper of said ponds.

12. In combination with a river, two ponds located at different elevations in the stream of the river, water power plants in the stream of the river, including one at the stream outlet of each of said ponds, the discharge water levels and the headwater levels of said plants between said ponds overlapping, hydraulic rotary machines in said plants located above the lower of said ponds, said machines being adapted to operate as turbines to generate power, or as pumps to raise water from the lower of said ponds to the upper of said ponds.

FREDERICK A. ALLNER.